(12) United States Patent
Sethumadhavan et al.

(10) Patent No.: US 9,325,493 B2
(45) Date of Patent: Apr. 26, 2016

(54) SYSTEM AND METHODS FOR SILENCING HARDWARE BACKDOORS

(71) Applicants: Lakshminarasimhan Sethumadhavan, New York, NY (US); Adam Waksman, Pleasantville, NY (US)

(72) Inventors: Lakshminarasimhan Sethumadhavan, New York, NY (US); Adam Waksman, Pleasantville, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

(21) Appl. No.: 14/671,905

(22) Filed: Mar. 27, 2015

(65) Prior Publication Data
US 2015/0270952 A1     Sep. 24, 2015

Related U.S. Application Data

(62) Division of application No. 13/273,016, filed on Oct. 13, 2011, now Pat. No. 9,037,895.

(60) Provisional application No. 61/392,877, filed on Oct. 13, 2010, provisional application No. 61/442,638, filed on Feb. 14, 2011.

(51) Int. Cl.
| | | |
|---|---|---|
| *H04L 29/06* | (2006.01) | |
| *G06F 11/00* | (2006.01) | |
| *G06F 12/16* | (2006.01) | |
| *G08B 23/00* | (2006.01) | |
| *H04L 9/00* | (2006.01) | |
| *G06F 21/76* | (2013.01) | |

(52) U.S. Cl.
CPC ............... *H04L 9/002* (2013.01); *G06F 21/76* (2013.01); *H04L 9/008* (2013.01); *H04L 2209/16* (2013.01)

(58) Field of Classification Search
CPC ......... H04L 9/008; H04L 9/002; H04L 9/004; G06F 21/71; G06F 21/70; G06F 21/76
See application file for complete search history.

(56) References Cited

U.S. PATENT DOCUMENTS

| | | |
|---|---|---|
| 5,513,319 A | 4/1996 | Finch et al. |
| 6,233,685 B1 | 5/2001 | Smith et al. |
| 6,847,572 B2 | 1/2005 | Lee et al. |

(Continued)

OTHER PUBLICATIONS

Suh et al.; Design and Implementation of the AEGIS Single-Chip Secure Processor Using Physical Random Functions; 2005; Retrieved from the Internet <URL: dl.acm.org/citation.cfm?id=1069974>; pp. 1-12 as printed.*

(Continued)

*Primary Examiner* — Tae Kim
(74) *Attorney, Agent, or Firm* — Hunter Clark PLLC

(57) ABSTRACT

Methods for preventing activation of hardware backdoors installed in a digital circuit, the digital circuit comprising one or more hardware units to be protected. A timer is repeatedly initiated for a period less than a validation epoch, and the hardware units are reset upon expiration of the timer to prevent activation of a time-based backdoor. Data being sent to the hardware unit is encrypted in an encryption element to render it unrecognizable to a single-shot cheat code hardware backdoor present in the hardware unit. The instructions being sent to the hardware unit are reordered randomly or pseudo-randomly, with determined sequential restraints, using a reordering element, to render an activation instruction sequence embedded in the instructions unrecognizable to a sequence cheat code hardware backdoor present in the hardware unit.

28 Claims, 10 Drawing Sheets

(56) References Cited

U.S. PATENT DOCUMENTS

| | | | | |
|---|---|---|---|---|
| 8,296,849 | B2* | 10/2012 | Barron | G06F 21/125 365/15 |
| 8,681,973 | B2* | 3/2014 | Weinman | 380/28 |
| 9,098,700 | B2* | 8/2015 | Sethumadhavan | G06F 9/30145 |
| 2004/0025011 | A1 | 2/2004 | Azema et al. | |
| 2004/0165452 | A1 | 8/2004 | Nakano | |
| 2006/0156008 | A1 | 7/2006 | Frank | |
| 2007/0115091 | A1 | 5/2007 | Bandaru | |
| 2008/0115216 | A1* | 5/2008 | Barron | G06F 21/125 726/24 |
| 2008/0282345 | A1 | 11/2008 | Beals | |
| 2011/0298515 | A1 | 12/2011 | Kim et al. | |
| 2013/0061322 | A1* | 3/2013 | Sethumadhavan | G06F 9/30145 726/23 |

OTHER PUBLICATIONS

Juma et al.; Protecting Cryptographic Keys against Continual Leakage; Aug. 2010; Retrieved from the Internet <URL: link.springer.com/book/10.1007/978-3-642-14623-7>; pp. 1-18 as printed.*

Messerges, Thomas; Securing the AES Finalists Against Power Analysis Attacks; 2001; Retrieved from the Internet <URL: link.springer.com/chapter/10.1007/3-540-44706-7_11#page-1>; pp. 1-15 as printed.*

Gentry, Craig; Fully Homomorphic Encryption Using Ideal Latices; 2009; Retrieved from the Internet <URL: cs.cmu.edu/~odonnell/hits09/gentry-homomorphic-encryption.pdf>; pp. 1-10 as printed.*

Jin et al.; Hardware Trojan Detection Using Path Delay Fingerprint; 2008; Retrieved from the Internet <URL: http://ieeexplore.ieee.org/xpls/abs_all.jsp?arnumber=4559049&tag=1>; pp. 1-7 as printed.*

Carre, H., Doxtator, R. H., & Duffy, M. C. (Sep. 5, 1982). Semiconductor manufacturing technology at IBM. IBM Journal of Research and Development, 26(5), 528-531.

Swift, M. M., Martin, S., Levy, H. M., & Eggers, S. J. (Jul. 2002). Nooks: An architecture for reliable device drivers. Proceedings of the 10th workshop on ACM Special Interest Group on Operating Systems (SIGOPS) European workshop, 102-107. ACM.

Gassend, B., Clarke, D., Van Dijk, M., & Devadas, S. (Nov. 2002). Silicon physical random functions. Proceedings of the 9th ACM conference on Computer and Communications Security, 148-160. ACM.

Swift, M. M., Bershad, B. N., & Levy, H. M. (Oct. 2003). Improving the reliability of commodity operating systems. SOSP '03 Proceedings of the nineteenth ACM symposium on Operating systems principles, 37(5), 207-222. ACM.

Lee, J. W., Lim, D., Gassend, B., Suh, G. E., Van Dijk, M., & Devadas, S. (Jun. 17-19, 2004). A technique to build a secret key in integrated circuits for identification and authentication applications. 2004 Symposium on VLSI Circuits. Digest of Technical.

Grand, J. (Jul. 30, 2004). Advanced Hardware Hacking Techniques [PowerPoint slides]. Retrieved from http://grandideastudio.com/wp-content/uploads/advanced_hardware_hacking_slides.pdf.

United Stated Department of Defense. (2005). Defense Science Board Task Force on High Performance Microchip Supply. Washington, D.C: Office of the Under Secretary of Defense for Acquisition, Technology, and Logistics.

Agrawal, D., Baktir, S., Karakoyunlu, D., Rohatgi, P., & Sunar, B. (Apr. 21, 2006). Trojan Detection using IC Fingerprinting. IBM Research Report RC24110 (W0604-109), 26 pgs. Retrieved from http://domino.research.ibm.com/library/cyberdig.nsf/papers/F6E8.

Agrawal, D., Baktir, S., Karakoyunlu, D., Rohatgi, P., & Sunar, B. (May 2007). Trojan Detection using IC Fingerprinting. IEEE Symposium on Security and Privacy (SP '07), 296-310. IEEE. doi:10.1109/SP.2007.36.

Suh, G. E., & Devadas, S. (Jun. 2007). Physical unclonable functions for device authentication and secret key generation. Proceedings of the 44th annual Design Automation Conference (DAV '07), 9-14. ACM. doi:10.1145/1278480.1278484.

Military & Aerospace Electronics. (Jul. 18, 2007). Information security market forecast to reach $79 billion by 2010. Retrieved from http://www.militaryaerospace.com/articles/2007/07/information-security-market-forecast-to-reach-79-billion-by-2010.html.

King, S. T., Tucek, J., Cozzie, A., Grier, C., Jiang, W., & Zhou, Y. (2008). Designing and implementing malicious hardware. Proceedings of the 1st USENIX Workshop on Large-Scale Exploits and Emergent Threats (LEET), 5:1-5:8. USENIX Association. Retrieved.

Adee, S. (May 2008). The Hunt for the Kill Switch. Spectrum, IEEE Spectrum Magazine, 45(5), 34-39.

Banga, M., Chandrasekar, M., Fang, L., & Hsiao, M. S. (May 4, 2008). Guided test generation for isolation and detection of embedded trojans in ics. GLSVLSI '08: Proceedings of the 18th ACM Great Lakes symposium on VLSI, 363-366. ACM.

Wang, X, Tehranipoor, M., & Plusquellic, J. (Jun. 2008). Detecting malicious inclusions in secure hardware: Challenges and solutions. In Hardware-Oriented Security and Trust, 2008. HOST 2008. IEEE International Workshop on (pp. 15-19). IEEE.

Jin, Y., & Makris, Y. (Jun. 2008). Hardware Trojan detection using path delay fingerprint. IEEE International Workshop on Hardware-Oriented Security and Trust (HOST 2008), 51-57. IEEE.

Chakraborty, R. S., Paul, S., & Bhunia, S. (Jun. 2008). On-demand transparency for improving hardware Trojan detectability. IEEE International Workshop on Hardware-Oriented Security and Trust (HOST 2008), 48-50. doi: 10.1109/HST.2008.4559048.

Banga, M., & Hsiao, M. S. (Jun. 2008). A region based approach for the identification of hardware Trojans. IEEE International Workshop on Hardware-Oriented Security and Trust (HOST 2008), 40-47. doi: 10.1109/HST.2008.4559047.

Li, J., & Lach, J. (Jun. 9, 2008). At-speed delay characterization for IC authentication and Trojan horse detection. IEEE International Workshop on Hardware-Oriented Security and Trust (HOST 2008), 8-14. doi: 10.1109/HST.2008.4559038.

Rad, R. M., Wang, X., Tehranipoor, M., & Plusquellic, J. (Nov. 2008). Power supply signal calibration techniques for improving detection resolution to hardware Trojans. Proceedings of the 2008 IEEE/ACM International Conference on Computer-Aided Desig.

Semiconductor Industry Association (SIA). (Dec. 18, 2008). The Critical Role of Semiconductors in Solving America's Challenges. Retrieved from http://sia-online.org/galleries/Publications/SIA%20Letter%20to%20Transition%20Team%20%20-%2008.12.18.pdf.

Loh, G. H., Subramaniam, S., & Xie, Y. (Apr. 2009). Zesto: A cycle-level simulator for highly detailed microarchitecture exploration. IEEE International Symposium on Performance Analysis of Systems and Software (ISPASS 2009), 53-64. IEEE.

Salmani, H., Tehranipoor, M., & Plusquellic, J. (Jul. 27, 2009). New design strategy for improving hardware trojan detection and reducing trojan activation time. IEEE International Workshop on Hardware-Oriented Security and Trust (HOST'09), 66-73. IEEE.

Devadas, S., & Yu, M. (Jan.-Feb. 2010). Secure and robust error correction for physical unclonable functions. Design & Test of Computers, 27(1), 48-65. IEEE.

Databeans. (Jan. 2010). 2010 Microprocessors. 2010 Market Research Report-Abstract. Retrieved from http://www.databeans.net/reports/current_reports/SemiProd_Microprocessors.php.

Gentry, C. (Mar. 2010). Computing arbitrary functions of encrypted data. Communications of the ACM, 53(3), 97-105. doi: 10.1145/1666420.1666444.

Hicks, M., Finnicum, M., King, S. T., Martin, M. M. K., & Smith, J. M. (May 2010). Overcoming an untrusted computing base: Detecting and removing malicious hardware automatically. 2010 IEEE Symposium on Security and Privacy (SP), 159-172.

Waksman, A., & Sethumadhavan, S. (May 2010). Tamper evident microprocessors. Proceedings of the 31st IEEE Symposium on Security and Privacy (SP), 173-188. IEEE.

Osadchy, M., Pinkas, B., Jarrous, A., & Moskovich, B. (May 16-19, 2010). SCiFI—A System for Secure Face Identification. 2010 IEEE Symposium on Security and Privacy (SP), 239-254. IEEE.

United States. Department of Commerce. National Institute of Standards and Technology (NIST). (Jun. 2010). Piloting Supply Chain Risk Management Practices for Federal Information Systems. Draft NISTIR 7622 by M. Swanson, N. Bartol, and R. Moorthy.

(56) References Cited

OTHER PUBLICATIONS

Brown, E. (Aug. 3, 2010). New NIST Report Advises: Securing Critical Computer Systems Begins at the Beginning. Retrieved from http://www.nist.gov/itl/csd/security_080310.cfm.

IBM. (Aug. 25, 2010). IBM X-Force® 2010 Mid-Year Trend and Risk Report. Retrieved from http://www-05.ibm.com/fr/pdf/IBM_X-Force2010_Mid-Year_Trend_and_Risk_Report.pdf.

Semiconductor Industry Association (SIA). (Oct. 4, 2010). Global Chip Sales Increase 1.8 Percent Month-on-Month. Global Sales Report. Retrieved from http://www.semiconductors.org/news/2010/10/04/global_sales_reports_2010/global_chip_sales_increase_1.8.

Intel. (n.d.). Intel Quality and Reliability. Intel.com. Retrieved from http://www.intel.com/content/www/us/en/quality/quality-reliability.html?iid=tech_man+mqr.

* cited by examiner

FIG. 9A

Analysis of OpenSPARC T2 Processor Core HDL

| Unit Name | File Name | Control Interface Groups | Total Control Wires | Data Interface Groups | Total Data Wires | Largest Control Interface To Be Exhausted (in Bits) | Cases To Be Exhausted In Largest Control Interface | Purpose of Largest Control Signal | Fraction of Data Interfaces That Cannot Be Trivially Obfuscated | Explanation of Obfuscation Difficulties |
|---|---|---|---|---|---|---|---|---|---|---|
| Decoder | dec.v | 13 | 369 | 8 | 264 | 8 | 256 | Thread Activity Status | 100% | Instruction Parsing Depends On Format |
| Execution | exu.v | 6 | 165 | 5 | 271 | 10 | 1024 | Memory Bus Interface Control | 80% | Input Values Supplied To ALUs |
| FGU | fgu.v | 8 | 135 | 7 | 449 | 8 | 256 | Operation Control From Decoder | 100% | Inputs Supplied To Non-Trivial Logic |
| Load/Store Gasket | gkt.v | 7 | 64 | 8 | 452 | 11 | 2048 | CPU ID Header In Crossbar Packet | 0% | N/A |
| Fetch/ Cache Unit | ifu_cmu.v | 10 | 80 | 2 | 168 | 8 | 256 | Thread-Based Fetch Trap Control | 0% | N/A |
| Load/ Store Unit | lsu.v | 9 | 237 | 7 | 507 | 8 | 256 | Immediate ASI Control | 0% | N/A |
| Memory Management Unit | mmu.v | 12 | 167 | 2 | 343 | 18 | 262,144 | Cache-To-Processor Crossbar Control | 0% | N/A |
| Thread Pick Unit | pku.v | 7 | 684 | 8 | 354 | 8 | 256 | Thread-Based Flush Control From TLU | 0% | N/A |
| Power Management Unit | pmu.v | 7 | 105 | 1 | 64 | 13 | 8192 | Event Information From Decoder | 0% | N/A |
| Stream Processing Unit | spu.v | 1 | 18 | 1 | 48 | 3 | 8 | Thread ID | 0% | N/A |
| Trap Logic Unit | tlu.v | 11 | 560 | 6 | 347 | 18 | 262,144 | Cache-To-Processor Crossbar Control | 0% | N/A |
| Average | N/A | 8.27 | 234.91 | 5 | 297 | 10.27 | 48,804 | N/A | 25.45% | N/A |

Analysis of OpenSPARC T2 Processor HDL: Memory System and System-on-Chip

| Unit Name | File Name | Control Interface Groups | Total Control Wires | Data Interface Groups | Total Data Wires | Largest Control Interface To Be Exhausted (in Bits) | Cases To Be Exhausted In Largest Control Interface | Purpose of Largest Control Signal | Fraction of Data Interfaces That Cannot Be Trivially Obfuscated | Explanation of Obfuscation Difficulties |
|---|---|---|---|---|---|---|---|---|---|---|
| Level 2 Tag Manager | l2t.v | 16 | 85 | 3 | 357 | 8 | 256 | Processor Crossbar to L2 Control | 33% | SII Request Includes ECC And Header |
| Cache Bank Manager | l2b.v | 5 | 112 | 5 | 922 | 16 | 65536 | Level 2 Eviction Controls | 0% | N/A |
| Memory Control Unit | ncu.v | 6 | 268 | 6 | 530 | 14 | 16384 | FSR Network Interfaces Sync Control | 0% | N/A |
| Non-Cacheable Unit | ncu.v | 20 | 228 | 4 | 226 | 8 | 256 | SPC Running Status | 0% | N/A |
| Data Management Unit | dmu.v | 5 | 130 | 5 | 576 | 8 | 256 | SIO Parity Checks | 0% | N/A |
| System Interface Unit | siu.v | 21 | 182 | 10 | 512 | 8 | 256 | Packet Parity From Ethernet | 0% | N/A |
| Crossbar | ccx.v | 17 | 250 | 17 | 2354 | 8 | 256 | SPC Controls | 0% | N/A |
| Network Interface Unit | niu.v | 9 | 153 | 2 | 160 | 8 | 256 | SIO Parity Checks | 0% | N/A |
| Average | N/A | 12.375 | 176 | 6.5 | 704.6 | 9.75 | 10432 | N/A | 4.17% | N/A |

FIG. 9B

SYSTEM AND METHODS FOR SILENCING HARDWARE BACKDOORS

CROSS-REFERENCE TO RELATED APPLICATIONS

This application is a divisional application of, and claims priority to, U.S. patent application Ser. No. 13/273,016, entitled "SYSTEM AND METHODS FOR SILENCING HARDWARE BACKDOORS," and filed Oct. 13, 2011, which claims priority to, and the benefit of, U.S. Provisional Patent Application No. 61/392,877, filed on Oct. 13, 2010, and U.S. Provisional Patent Application No. 61/442,638, filed Feb. 14, 2011, the contents of all of which are hereby incorporated by reference in their entireties.

STATEMENT REGARDING FEDERALLY SPONSORED RESEARCH

This invention was made with government support under Grant No. FA 9550-09-1-0389 awarded by the Air Force Office of Scientific Research (AFOSR), and Grant No. FA8750-10-2-0253 awarded by Defense Advanced Research Projects Agency (DARPA). The government has certain rights in the invention.

BACKGROUND

Malicious modifications to hardware from insiders pose a significant threat today. The complexity of hardware systems and the large number of engineers involved in the designing of them pose a security threat, because it is easy for one malicious individual to alter one tiny piece of a system. Although this behavior is very risky, it can be very profitable for an attacker, because a hardware backdoor provides a foothold into any sensitive or critical information in the system. Such attacks can be especially devastating to security-critical domains, such as military and financial institutions. Hardware, as the root of the computing base, must be trustworthy, but this trust is becoming harder and harder to assume.

A malicious modification or a backdoor can find its way into a design in several ways. The modification could come from a core design component, e.g., a few lines of Hardware Design Language (HDL) core code can be changed to cause malicious functionality. The use of third-party intellectual property (IP) provides another opportunity. Today's hardware designs use an extensive array of third party IP components, such as memory controllers, microcontrollers, display controllers, DSP and graphics cores, bus interfaces, network controllers, cryptographic units, and an assortment of building blocks, such as decoders, encoders, CAMs and memory blocks. Often these units are acquired from vendors as HDL implementations and integrated into designs only after passing validation tests without code review for malicious modifications. Even if complete code reviews are possible, they are extremely unlikely to find carefully hidden backdoors, as evidenced by the fact that non-malicious modern designs ship with many bugs today.

An aspect of hardware backdoors that makes them so hard to detect during validation is that they can lie dormant during (random or directed) testing and can be triggered to wake up at a later time Verification fails because designs are too large to formally verify, and there are exponentially many different ways to express a hardware backdoor.

Hardware backdoor protection is a relatively new area of research that protects against a serious threat. Recently, some attention has been given to protecting hardware designs from hardware backdoors implanted by malicious insiders, but there are currently only two known solutions that have been proposed. A method has been designed for statically analyzing RTL code for potential backdoors, tagging suspicious circuits, and then detecting predicted malicious activity at runtime. This hardware/software hybrid solution can work for some backdoors and even as a recovery mechanism. Its admitted weaknesses are that the software component is vulnerable to attack and additionally that the software emulator must itself run on some hardware, which can lead to infinite loops and DOS (denial of service).

There has been work in tangentially related areas of hardware protection, usually leveraging a trusted piece of the design or design process. Significant work has been done (mainly in the fabrication phase) toward detecting active backdoors, analyzing side-channel effects, detecting suspicious path delays and detecting backdoors added at the fabrication level. However, all of this work assumes that the properties of the backdoors are limited and that there is a golden netlist (trusted RTL description). The reason for this common assumption of a trusted front end code base is that code is often written by insiders whereas the manufacturing process is often outsourced. However, increasing design team sizes and increasing use of third party IP on-chip are making this assumption about the front end less realistic.

A fundamental difference between the embodiments described herein and previous work is that since we disable the backdoor at its origination point—the trigger—we provide a much more general solution than previous approaches. Both previous solutions use deterministic methods to protect against a subset of the attack space. Our methods, by contrast, provide probabilistic guarantees against all deterministic, digital backdoor triggers. Unlike other methods, our scheme can prevent DOS attacks.

SUMMARY

We describe herein techniques that allow us to build trustworthy hardware systems from components designed by untrusted designers or procured from untrusted third-party IP providers.

We present the first solution for disabling digital, design-level hardware backdoors. The principle is that rather than try to discover the malicious logic in the design—an extremely hard problem—we make the backdoor design problem itself intractable to the attacker. The idea is to scramble inputs that are supplied to the hardware units at runtime, making it infeasible for malicious components to acquire the information they need to perform malicious actions.

We show that the described techniques cover the attack space of deterministic, digital HDL backdoors, provide probabilistic security guarantees, and can be applied to a wide variety of hardware components. Our evaluation with the SPEC 2006 benchmarks shows negligible performance loss (less than 1% on average) and that our techniques can be integrated into contemporary microprocessor designs.

In one aspect, the disclosed embodiments provide a method and corresponding system for preventing activation of hardware backdoors installed in a digital circuit, the digital circuit comprising one or more hardware units to be protected and a clock which produces a clock signal. The method includes initiating a timer set for a period less than or equal to a determined validation time period of the digital circuit. The method further includes performing a reset operation on the hardware units upon expiration of the timer by turning off power to the hardware units for at least one cycle of the clock signal to interrupt operation of the hardware units. The method further includes continually repeating the initiating of the timer for further reset operations while the digital circuit is in operation.

In another aspect, the disclosed embodiments provide a method and corresponding system for preventing activation of hardware backdoors installed in a digital circuit, the digital circuit comprising at least one hardware unit to be protected, at least one encryption element, and at least one decryption element. The method includes receiving, in the encryption element, data being sent to the hardware unit. The data is encrypted in the encryption element and output to the hardware unit. The hardware unit processes the encrypted data and outputs the processed data. The method further includes decrypting the data in the decryption element after the data is output by the hardware unit. The encryption of the data renders an activation code, embedded in the data, unrecognizable to a hardware backdoor present in the hardware unit.

In another aspect, the disclosed embodiments provide a method and corresponding system for preventing activation of hardware backdoors installed in a digital circuit, the digital circuit comprising at least one hardware unit to be protected, the hardware unit being a cryptographic unit. The method includes generating a random value y and computing, in a verified arithmetic logic unit (ALU), a product $z=xy$, where x is a sensitive data element. The method further includes encrypting the value z in the cryptographic unit to obtain the encrypted value $RSA(z)$; and encrypting the value y in the cryptographic unit to obtain the encrypted value $RSA(y)$. The method further includes computing an encrypted value corresponding to the sensitive data element $RSA(x)$ by dividing $RSA(z)$ by $RSA(y)$ using the verified ALU or a second ALU.

In another aspect, the disclosed embodiments provide a method and corresponding system for preventing activation of hardware backdoors installed in a digital circuit, the digital circuit comprising at least one hardware unit to be protected and at least one reordering element. The method includes receiving, in the reordering element, instructions being sent to the hardware unit. The method further includes reordering the instructions randomly or pseudo-randomly, with determined sequential restraints, using the reordering element and outputting the reordered instructions to the hardware unit. The instructions are processed in the hardware unit. The reordering of the instructions renders an activation instruction sequence, embedded in the instructions, unrecognizable to a hardware backdoor present in the hardware unit.

BRIEF DESCRIPTION OF THE DRAWINGS

The above and other objects and advantages of the disclosed subject matter will be apparent upon consideration of the following detailed description, taken in conjunction with accompanying drawings, in which like reference characters refer to like parts throughout, and in which:

FIG. 9A is a table that shows the results of a manual analysis of the Hardware Design Language (HDL) for an OpenSPARC T2 processor core.

FIG. 9B is a table that shows the results of a manual analysis of the HDL for the top-level interfaces for the modules in the memory system and the rest of the system-on-chip for the OpenSPARC T2 processor.

DETAILED DESCRIPTION

The discussion below demonstrates that even if we cannot find hidden malicious logic in a microprocessor during validation testing of the device, it is still possible to disable backdoors. One insight is that while validation testing is incomplete, it provides a strong foundation that can be leveraged to increase trustworthiness. Specifically, validation demonstrates that the hardware functions in a certain way for a subset of the possible inputs. Because the hardware passes validation tests (which it must in order to make it to market), any malicious logic must be dormant for the entire testing input space, waiting for something to trigger it. If we silence those triggers, we can prevent the backdoors from turning on without having to explicitly detect the backdoor logic.

Certain digital backdoor triggers can be injected by an inside designer. We describe methods to disable all of these types of triggers by obfuscating or scrambling inputs supplied to the hardware units in order to prevent those units from recognizing triggers. These techniques must alter inputs in a benign way so that after validation testing, hardware can never receive inputs that appear distinct from what was already tested but can also produce correct outputs with minimal changes to the design. We describe three techniques, as shown in FIG. 1, that, in concert, disable backdoor triggers.

Figure 1:
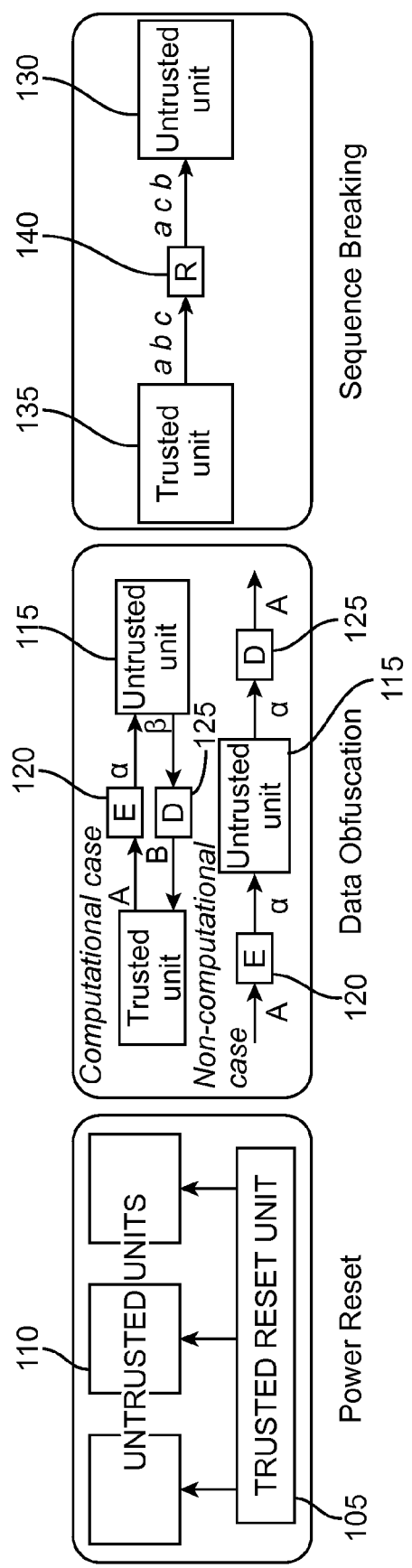
FIG. 1 shows block diagrams depicting obfuscation techniques to disable backdoor triggers.

Specifically, FIG. 1 shows block diagrams depicting obfuscation techniques to disable backdoor triggers. The left-hand diagram depicts power resets. The middle diagram depicts data obfuscation, both for computational and non-computational units. The right-hand diagram depicts sequence breaking by reordering. In these diagrams, E=Encryption Unit, D=Decryption Unit, and R=Reordering Unit. These units are trusted and small enough to be formally verified.

Power Resets The first technique prevents untrusted units from detecting or computing how long they have been active, thus preventing time-based attacks.

Data Obfuscation The second technique encrypts input values to untrusted units to prevent them from receiving special codes, thus preventing them from recognizing data-based triggers.

Sequence Breaking The final technique pseudo-randomly scrambles the order of events entering untrusted units to prevent them from recognizing sequences of events that can serve as data-based triggers.

Our solutions are broadly applicable to many types of digital hardware, but in this description we study the feasibility of our techniques using the OpenSPARC T2 muticore chip from Oracle (formerly Sun Microsystems). Our study shows that the three techniques presented herein, taken together, provide coverage against all known types of digital hardware design backdoors for many on-chip hardware modules in the openSPARC design. This coverage can further be expanded with a small amount of duplication. Based on simulation of SPEC 2006 benchmarks, an industry standard benchmark suite for measuring performance of processors, we also show that these techniques incur negligible performance losses.

Our model for digital hardware is an interconnected set of modules, which are connected via interfaces. Since hardware is usually composed of several small modules, and since communication happens via interfaces, we enforce security at the interface level. If we can ensure that trigger payloads cannot be delivered through any interface then we can be assured that backdoors cannot be triggered in hardware.

Figure 2:
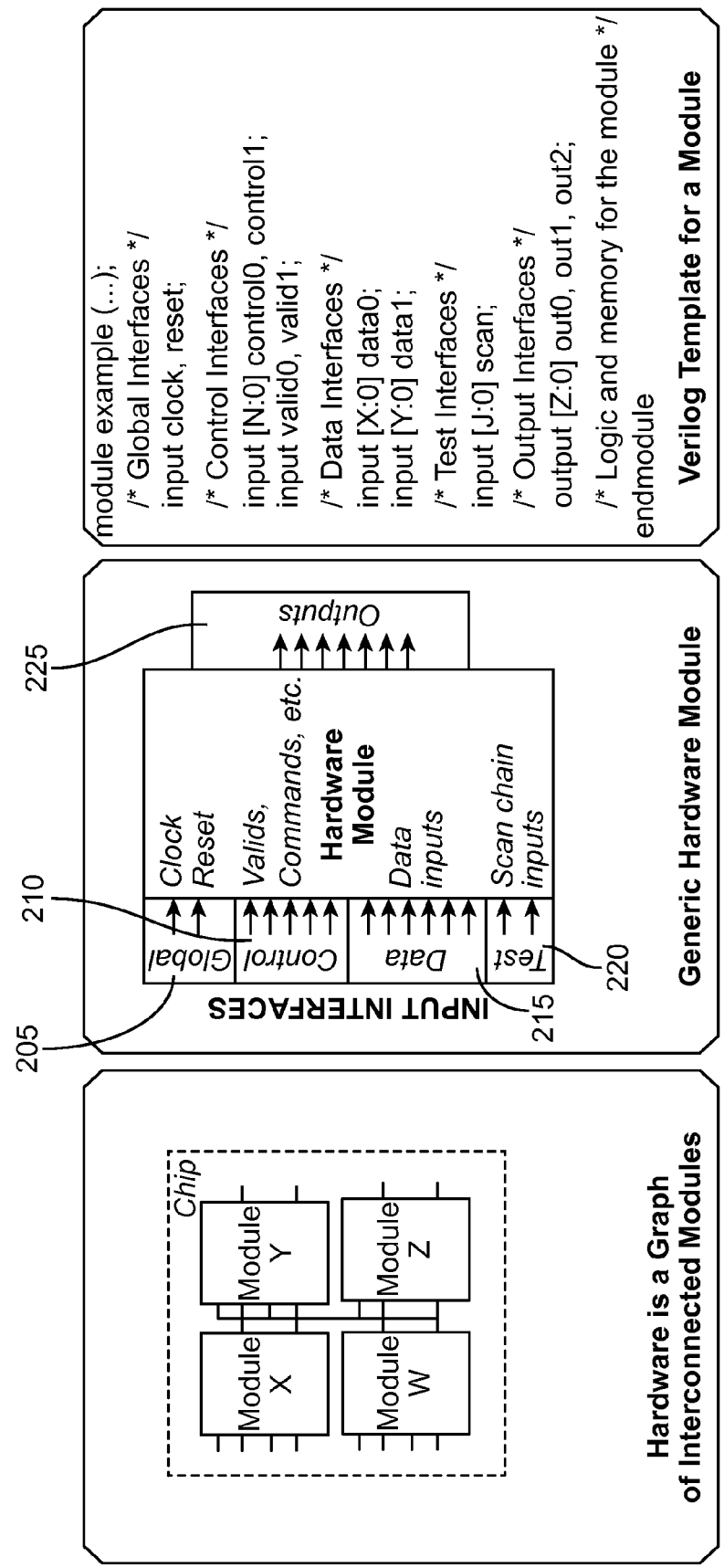
FIG. 2 shows a block diagram depicting interconnected hardware modules (left); the five types of interfaces of a hardware module (center); and an example Verilog template for a module (right).

As shown in FIG. 2, the interfaces to digital hardware modules can be broken down into five categories—four types of input interfaces and a set of output interfaces. A backdoor can only be triggered by malicious inputs on one of the input interfaces. The code on the right-hand side of FIG. 2 shows an example of a Verilog template for a module.

The five categories are as follows:
Global Interfaces (205): A global interface is a set of signals module example that is provided to all modules. This usually includes a clock signal, a reset signal, and power signals.
Control Interfaces (210): An interface of this type is one or more wire groups that control how the unit operates. Examples include inputs that control transitions in a state machine and input bits that indicate validity of data supplied to the unit.
Data Interfaces (215): An interface of this type represents a single value that is used as such in a module. For example, an integer being fed into an ALU or an address being passed into a memory controller are both data interfaces.
Test Interfaces (220): A test interface is an interface that is only used for post-manufacture testing and serves no purpose after deployment. An example of this is a scan chain interface.
Output Interfaces (225): These are the interfaces for the signals coming out of a module. They can potentially feed into any of the four types of input interfaces (data, control, global, test). In the common case, these will either feed into data or control interfaces.

For any given attack, one can pinpoint the interfaces that first violate specification, i.e. the first one to yield an incorrect result or cause an erroneous state transition. While an attack may be complex and involve coordination between several hardware modules, if each individual interface is forced to behave correctly, then the attack cannot be executed. Thus to prevent hardware backdoor triggers we examine hardware interfaces on a module by module basis to suggest security modifications. Further, there are only a limited number of ways in which attacks on these interfaces can be triggered, which leads to few particular security methods, as discussed in further detail below.

Attack Space and Vectors

Our threat model allows for any insider to modify the HDL specification of digital hardware. The attack space is the set of all input interfaces for all modules that constitute the hardware design. We focus only on the input interfaces (global, test, control, data) because if all input interfaces are secured and the unit's functionality has been validated, then the outputs can be trusted. Our attack vectors include two different types digital triggers—data and time. We break data triggers into two further sub-types—sequence and single-shot. Next, we describe each of the three trigger types and explain how they are coupled with types of input interfaces.

Ticking Timebombs: A malicious HDL designer can program a timebomb backdoor into HDL code so that a backdoor automatically triggers a fixed amount of time after the unit powers on. For example, a microcontroller can be programmed to fail after a pre-determined number of clock cycles. This type of attack poses a serious threat to many high security areas. Even if the hardware is used in a secure, tamper-free environment, running only trusted code, a timebomb can undermine the security of the system or function as a 'kill switch'. Additionally, this type of attack does not require the adversary to have any access to the machine under attack.

One aspect of ticking timebombs that makes them so dangerous is that they are completely undetectable by any validation techniques. Even a formal validation technique that verifies all possible input values cannot prove that a timebomb will never go off (since validation lasts only a finite amount of time, one can never know if validation has run for a long enough period of time). Thus a well-placed timebomb can be inserted by a designer, evade all validation techniques, and trigger at any time, without warning.

Ticking timebombs are associated with global interfaces. This is because the digital clock signal is the only way to monitor the passage of time in synchronous digital designs. Other information can serve as a way of keeping track of or estimating the passage of time, e.g., turn on backdoor after a million cache misses. However, as we describe in below, these timebombs ultimately depend on the clock signal to record passage of time and thus can be protected by protecting the global interface.

Cheat Codes: Backdoors that are triggered by data values are called cheat codes. A cheat code is a special input (or sequence of inputs) that functions as a key to open up or 'turn on' malicious hardware. A cheat code can be thought of as secret information that the attacker uses to identify his or her self to the hardware backdoor logic. This identity must be unique to avoid being accidentally provided during validation tests. In contrast to timebombs this type of attack requires an additional attack vector: in addition to the malicious designer programming a backdoor into the HDL design, there must be a user who can execute code on the malicious hardware in order to provide the cheat code key.

There are two ways to communicate cheat codes. One way is to send a single data value containing the entire cheat code. We will call this a single-shot cheat code. A single-shot cheat code usually arrives at an interface as a large piece of data, such as an address. For example, the address 0xdecafbad could be the secret trigger that turns on the backdoor. In theory, single-shot cheat codes can be passed to the backdoor through control or data interfaces.

The other way to communicate a large cheat code is in multiple pieces. We will call this a sequence cheat code. This type of cheat code arrives in small pieces over multiple cycles or multiple inputs. Just like the single-shot codes, these cheat codes can be supplied through the data or control interfaces. For example, if the secret trigger is 0xdecafbad, and the malicious unit has a data interface big enough for a hex character, the attacker might pass the hex values 0xd, 0xe, 0xc, 0xa, 0xf, 0xb, 0xa, 0xd over eight different cycles (or inputs). Similarly, one could imagine an unusual series of loads and stores conveying a cheat code to a memory controller as a sequence through the control interface.

We note here that the inputs that compose a sequence cheat code do not necessarily have to arrive in consecutive cycles. They can arrive in a staggered fashion or over a long period of time. As long as the timing and the ordering is defined by the attacker and recognized in the backdoor trigger logic, the individual bits that together comprise the sequence cheat code can come in almost any arrangement, limited only by the creativity of the attacker.

To summarize the relationship between interfaces and triggers, data and control interfaces may be prone to cheat code attacks (either sequence or single-shot). Global interfaces are only open to timebomb attacks i.e. clock and reset can only take on two values and thus cannot serve as cheat codes. Output interfaces are not vulnerable so long as all input interfaces have been protected. One solution for test interfaces—if they are considered threatened—is to burn out those interfaces using programmable electronic fuses before deployment, since they are not needed post-deployment.

Attack Possibilities

We have two different attack settings that depend on how privileged the attacker(s) are. If the attacker has privileged access to the machine after it has been deployed (e.g., the attacker is a user as well as designer) then we must defend against cheat codes that might be inserted by malicious programs. If not, then we only have to protect against ticking timebombs because these are the only triggers that can be used by a malicious designer without the aid of an user. An example of this latter setting might occur if one organization or nation-state procures hardware from another nation-state but allows the hardware to be used only by trusted operatives.

Assumptions

Assumption #1: Triggers We assume that a hardware backdoor, by design, needs to escape validation testing. Therefore, it cannot be always active and must have some way of being triggered at a point in time after validation testing has been completed. We further assume that this trigger is a digital signal that can be designed into the HDL (as opposed to an internal analog circuit or any external factor, such as temperature). This is a reasonable assumption because at the HDL design level it is hard to program analog undriven circuits that pass validation. Nevertheless, one can imagine backdoors in analog circuitry or induced by external side channels. We leave these cases for future work.

Assumption #2: Trust in Validation Our solutions leverage the fact that we can use validation to determine that a component or a third party IP unit functions correctly and does not exfiltrate information for some finite number N cycles (where N is a typical validation epoch, e.g., a few million). This is typical practice when third party IP is procured. In the case that we are concerned about malicious insiders (as opposed to third party entities), validation engineers do not pose the same threat as a designer. This is because a single designer can insert a malicious backdoor that can circumvent the whole validation process, but validation teams tend to be large, and a single unit goes through multiple levels of validation tests (module, unit, core, chip, etc.), so it would take a conspiracy of almost the entire validation team to violate this trust.

Assumption #3: Unprotected units We leverage trust in small, manually or formally verifiable units. This includes small circuits we include to implement our security measures. We do not externally protect these units.

Our general approach is to introduce enough randomness into each hardware unit that a backdoor trigger cannot be reliably recognized by malicious circuitry. The objective of malicious circuitry is to detect unique or unusual inputs that are meant to trigger a backdoor, and if the inputs to the malicious logic are scrambled or encrypted, the act of detection becomes too difficult.

As described below, there are three different triggers we are concerned with—timebombs, single-shot cheat codes, and sequence cheat codes. A timebomb can be delivered only through the global interface (the clock signal), and the two types of cheat codes can be delivered through control or data interfaces. Each of these three triggers requires its own protection scheme. We discuss and present solutions for each of these three categories, as well as applicability, adaptation to modern microprocessors, and limitations.

Power Resets

The first category we consider is the time-based category—ticking timebombs. The power reset technique protects untrusted units from these timebomb triggers and is generally applicable to any digital hardware. The strategy described herein seeks to prevent untrusted logic from knowing that a large amount of time has passed since start-up. In other words, every untrusted hardware unit—regardless of whether it is in a core, memory system, off-chip, etc.—will at all times be in a state where it has only recently been turned on. We ensure this by frequently powering off and on each unit, causing data in local state (such as registers) to be lost.

Figure 3:
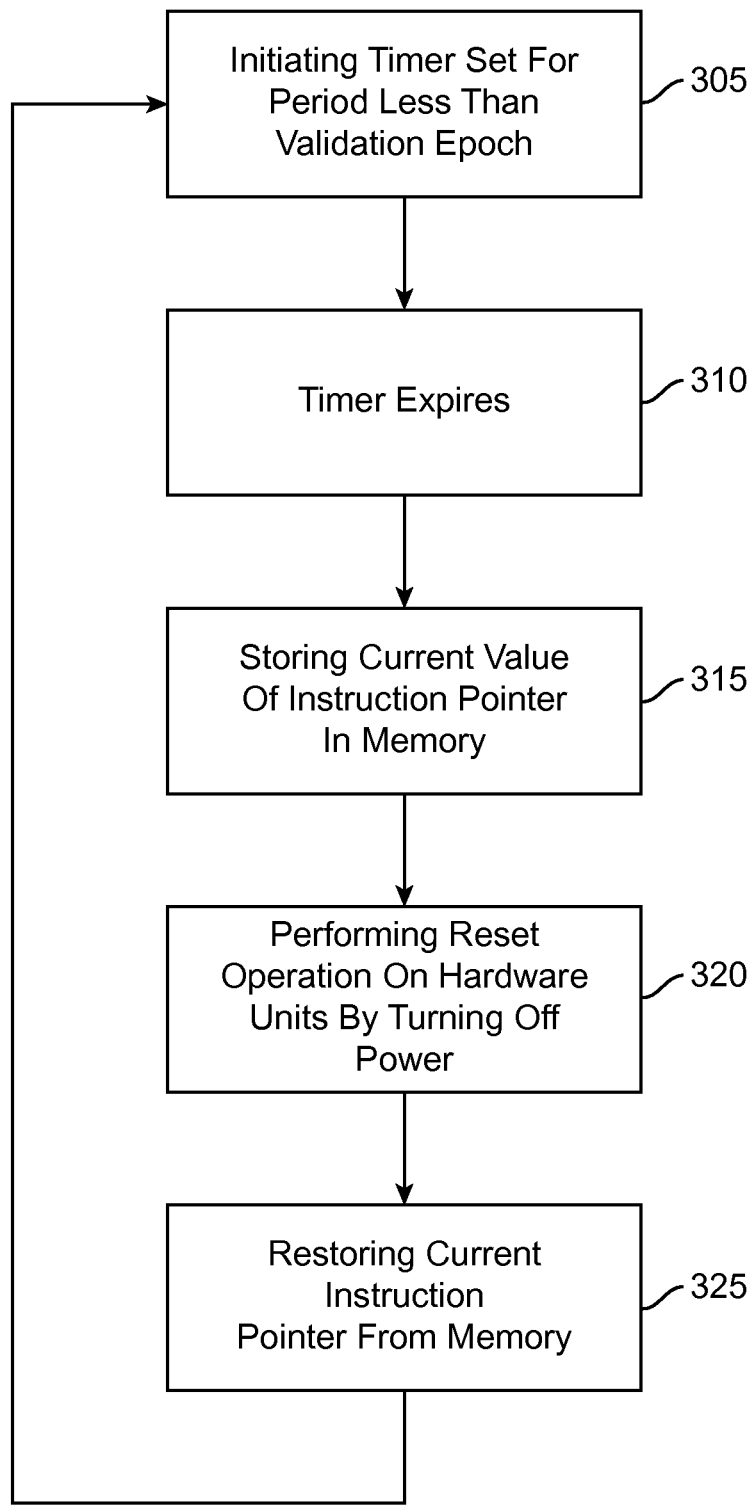
FIG. 3 depicts a method for preventing activation of ticking timebomb hardware backdoors.

The method for preventing activation of ticking timebomb hardware backdoor is depicted in FIG. 3 (see also FIG. 1). The method includes initiating a timer set for a period less than or equal to a determined validation time period of the digital circuit 305, i.e., the validation epoch. After the time expires 310, e.g., by counting down to zero, a current value of a placeholder register (or, more particularly, an instruction pointer register) may be stored in a memory 315 so that execution can be resumed after the reset operation. Other actions may also be taken to ensure consistency of execution, such as, for example, flushing the pipeline and storing other execution-related parameters. The reset operation 320 is performed by a trusted reset unit 105 (i.e., a unit which has been verified not to have backdoors by testing or analysis) on the untrusted hardware units 110 upon expiration of the timer by turning off power to the hardware units 110, usually for at least one cycle of the clock signal, to interrupt operation of the hardware units. After the reset, the current instruction pointer may be restored 325 using the value which was stored in memory. This process is repeated continually while the microprocessor, or other digital circuit, is in operation.

Thus, as described above, the circuit for power resets includes a counter that counts down from some preset value to zero (which may be implemented in the trusted reset unit 105). This value has to be smaller than the length of the validation epoch because the validation engineers need to validate that the hardware reaches a power reset without a timebomb going off. The validation epoch can vary, but it is a known value for any particular setting. The Verilog Hardware Description Language code that can issue this power reset is shown below (using as an example a validation epoch of 220=1, 048, 576 cycles). As can be seen from the implementation, it can be easily manually verified to be free of backdoors.

```
module reset (clk , rst , out);
    input c l k;
    input r s t ;
    output out ;
    reg [19:0] countdown ;
    always @( posedge c l k) begin
        if ( rst ) countdown <= 20 'b0 − 1 'b1 ;
```

```
        else countdown <= countdown - 1 'b1 ;
    end
        assign out = (countdown == 0);
endmodule
```

Naturally, hardware will need to have some continuity across epochs. For example, in the case of microprocessors, users will want to run programs that take much longer than the validation epoch. We get around this problem by using a lightweight version of context saving and restoring so that program execution is not disrupted by power resets. Each time we approach the validation epoch, we write the current instruction pointer(s) to memory, flush the pipeline, and power off the hardware units for one or a few cycles. This wipes all internal, volatile state and resets all registers, including both helpful ones (such as branch history tables) and malicious ones (such as ticking timebombs). The program then picks up where it left off.

Several practical issues may arise when applying this method to various real-world components:

Main Memory Writes: One security question that might arise is: Since main memory stays on, and since we write the instruction pointer to memory, can the timebomb counter be written to main memory?

Recall that by assumption, the microprocessor executes correctly during the validation epoch. This means that there cannot be any incorrect writes to main memory before the first power reset. Therefore, a trigger cannot be spread across multiple validation epochs.

Devices: Resetting various devices may require fine-grained management in device drivers. The device drivers may need support to replay transactions when peripherals power-cycle in the middle of a transaction.

Non-Volatile Memory: Another security issue that arises is non-volatile memory. Powering off wipes clean volatile memory and registers, but we may not be able to assume that all on-chip memory is volatile, as it may be possible to include a small amount of malicious on-chip flash or some other non-volatile memory.

Given a unit that we do not want to have hidden, non-volatile memory, how can we ensure that it has none? One way to do this is to burn out the memory. Many non-volatiles memories, such as flash, have limited write endurance. If a unit may have been maliciously configured to write a value to an internal piece of flash every time it is about to be powered off, then we can hook the clock up to the power signal of the hardware unit that is suspected to contain flash, causing the unit to turn off and back on repeatedly until the burn-out threshold, thus destroying any flash that might be inside. This procedure could be done very conveniently post-tapeout. Another strategy would be to take a few copies of the manufactured unit and visually inspect them to confirm that there is no non-volatile memory.

Unmaskable Interrupts: Even while powered off for a few cycles, it is possible that the microprocessor will receive an unmaskable interrupt from an external unit that is on. This signal should not be lost. In order to preserve correctness, a slight adjustment is required for off-chip components that can send unmaskable interrupts. These signals must go into a small buffer (which may be implemented in the trusted reset unit 105), e.g., a FIFO buffer, and wait for acknowledgement. If power is off, this acknowledgement will not come until a few cycles after they are issued.

Performance Counters: Some modern microprocessors include built-in performance counters that track certain performance statistics, such as clock cycles or cache misses. It is desirable for these counters to not be reset. However, this is a somewhat fundamental issue, because a performance counter is essentially a benign ticking timebomb trigger. Therefore, there is a trade-off between the ability to do easy performance tracking in hardware and the ability to be secure against ticking timebomb attacks. Our solution to this problem is to make use of a very small amount of trusted hardware (if logic is trivial enough it can be formally verified or checked by code review). This small hardware unit keeps track of the performance counters and keeps power during the resets. By keeping this unit trivial and allowing it only one output interface, we can make sure this unit is not sending information to other on-chip units or otherwise exfiltrating timing information.

Performance: Another practical issue is performance. If we periodically flush the pipeline and wipe out volatile memory, this can cause a performance hit. We salvage most of this performance by keeping power on to large, standard RAMs (e.g., caches, memory). We still lose various smaller pieces of state, such as branch history tables and information in prefetchers. In our experimental evaluation, we study the effect on performance of power resets.

Applicability and Limitations: The power reset method is universally applicable to any digital logic. It provides complete coverage against ticking timebombs, which is the more dangerous of the two general types of digital hardware backdoor triggers. More formal arguments as to why our solution is complete are provided below.

Data Obfuscation

The second category of attacks we consider are single-shot cheat codes. The insight behind our solution is that the attacker is expecting a particular input value to trigger the attack. If we obfuscate the inputs, then the attacker's unit can be deceived and fail to recognize the trigger.

The specific method for obfuscating the inputs depends on the type of hardware unit. We categorize hardware units into two general types—computational and non-computational—and discuss our solution for each type respectively.

Non-computational units: These units do not operate on data values; they only move them around. Many common units in real microprocessors fit this category. For example, a memory controller accepts a large address and a large data write value, but it often does not perform any logical operations on these. Similarly, many buses, interconnects, routers, etc. move around data without performing computation on the data. Obfuscating inputs to non-computational units can be done by using any encryption scheme to obfuscate the data before it enters the unit.

Figure 4:
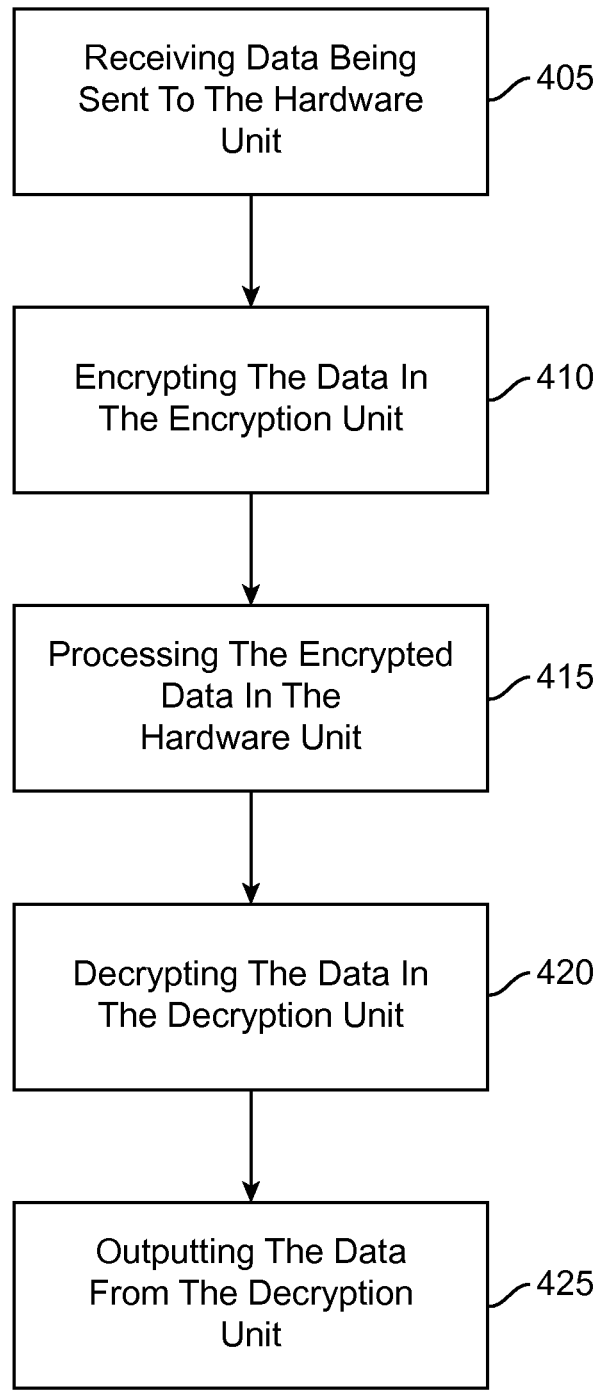
FIG. 4 depicts a method for preventing activation of single-shot cheat code hardware backdoors.

FIG. 4 (see also FIG. 1) depicts the method for preventing activation of single-shot cheat code hardware backdoors. The method includes receiving, in the encryption element, data being sent to the untrusted hardware unit 405, 115. The data is encrypted in the encryption element 410, 120 and output to the hardware unit 115. The encrypted data is processed in the hardware unit 415, 115 and output. As noted above, the processing in non-computational units may not result in a change to the data. The data output by the hardware unit is then decrypted in the decryption element 420, 125 and output by the decryption unit 425, 125.

We can use very low overhead encryption schemes to implement obfuscation. Since the value has to remain secret only for one or a few clock cycles, it does not have to be strong in the sense that software-based encryption schemes generally are. In the context of hardware backdoors, the attacker has very limited capabilities because of the restricted hardware budget and processing time to deploy an attack against the encryption scheme.

Some examples of encryption schemes include XOR or addition by a random value. For instance, a bit-wise XOR encryption scheme is provably secure when the ciphertext and plaintext cannot be simultaneously known or guessed. Using a hardware random number generator or a PUF, a random and secure key can be generated that only needs to be used and stored for a short time. This process can be orchestrated by encrypting the inputs to the unit with a small (manually or formally verifiable) circuit and decrypting the outputs from the unit with a similar circuit. From the perspective of the outside world, the hardware unit is unchanged. However, the hardware unit never sees any of the original data.

In one example of this hardware encryption or obfuscation, we can protect a black-box non-computational module called BLACK_BOX with the following manually-verifiable wrapper:

```
module black_box_wrapper(clk , rst , data ,
         control , random , out );
    input clk , rst , data , control , random;
    wire untrusted_out ;
    output out ;
    BLACK_BOX untrusted (.clk (clk ) ,
        . rst (rst),
        . data( data xor random) ,
        . control ( control ) ,
        . out( untrusted_out ));
    assign out = untrusted_out xor random;
endmodule
```

Computational units: Data encryption for computational units is more complex and must be done to some degree on a unit-by-unit basis. In a few cases, the complexity may be so great that duplication is more efficient, and duplication serves as a fall-back strategy.

Our method for obscuring these cheat codes is motivated by homomorphic encryption schemes from the realm of software. We call an operation f homomorphic with respect to another operation g if $f(g(x),g(y))=g(f(x,y))$. One example of this is when f is multiplication and g is the squaring function. Explicitly, $$x^2 y^2 (xy)^2$$

If the functionality required of a (toy example) untrusted unit is to compute the square of a value, we can obfuscate the input x to that unit by multiplying it by a random value y. The unit then computes the square $(xy)^2$, which is the same as $x^2 y^2$. To decrypt, we only have to divide by the constant $y^2$ to get back $x^2$.

More generally, if our obfuscation function is homomorphic over the computational function, then the computation can be done on the data while it is encrypted, and thus the computational unit does not have to be trusted. Any circuit can be obfuscated by a homomorphic function, but the cost can in theory be unacceptably large.

In the hardware context, we can place small encryption and decryption units (small enough to be manually or formally verified) between hardware components so that the component sees only encrypted values. In the non-computational case, since the internal function is the identity (i.e. nothing), we can use any invertible function. For units containing ALUs or other non-trivial logic, we require less trivial solutions. While a large portion of the units in real micro-processors are currently non-computational, especially units involved in memory subsystems and on-chip interconnects and routers, there is also an increasing use of accelerators and small functional units that use non-trivial logic.

Case Study: As a case study of this method for protecting computational units against single-shot cheat codes on data interfaces, we discuss how one can apply an obfuscation function to the inputs of a cryptographic unit, such that the obfuscation function is homomorphic over the cryptographic function. Cryptographic units are an interesting case because they are the tool we normally use for encryption, but they see confidential data in unencrypted form and are thus profitable units to attack. Additionally, these units—and many other on-chip functional units—are often procured as third party IP. However, cryptographic units tend to use well known cryptographic schemes for which we can design homomorphic obfuscation functions. Take for example the RSA algorithm. For any data values x and y, $$RSA(xy)=RSA(x)RSA(y)$$

Figure 5:
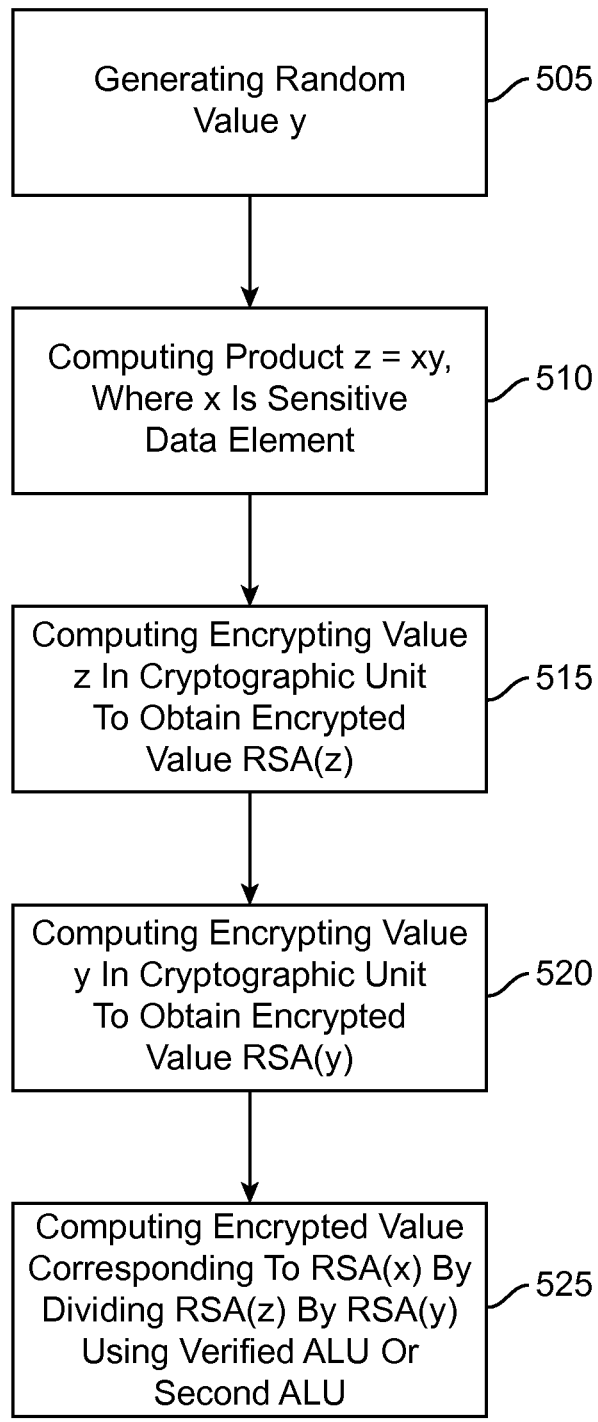
FIG. 5 depicts a method for preventing activation of hardware backdoors installed in a cryptographic unit.

If we want to encrypt a data value x using RSA on a special purpose RSA unit (as opposed to doing this with general purpose ISA instructions), we can perform the following algorithm, which is depicted in FIG. 5.

Use hardware to generate a random value y. (505)

Compute the product z=xy using a regular, trusted ALU, where x is the value to be encrypted. (510)

Send z to the cryptographic unit. That unit returns RSA(z)=RSA(xy)=RSA(x)RSA(y). (515)

Send y to the cryptographic unit to get RSA(y). (520)

Using the regular ALU, divide RSA(z) by RSA(y) to get RSA(x). (525)

We have used the untrusted cryptographic unit to encrypt the sensitive data x without allowing the unit to see the value of x. A potential weakness is that if this scheme is known and deterministic, the untrusted unit could divide alternating values by each other to derive x. Therefore, these values should be sent in a pseudo-random order. While this might leave a relatively small number of permutations (only a few million) to exhaust over, this scheme is perfectly good in this setting, because a hardware unit lacks the computational power to exhaust over millions of permutations each cycle.

Alternate Protection Schemes: Although homomorphic encryption can be applied to any circuit, some circuits are more difficult than others. Units that perform complex logical or arithmetic operations cannot usually be obfuscated using simple operations like XOR or multiplication because their custom logic is unlikely to have the right mathematical properties. For example, ALUs and decoders perform specific operations that cannot be trivially obfuscated. However, the code for this type of unit tends to be very small and can often be manually or formally verified. A final fall-back solution that can be applied if none of these techniques work is duplication, where n versions of the untrusted unit are designed by n different designers, and results are checked on a cycle by cycle basis. Duplication has a high area and power overhead, while the other techniques proposed are far more efficient and should be used whenever possible (if not 100% of the time).

Hardware Support: Encryption schemes at the on-chip inter-unit level require the efficient generation of truly random bits. This can be done realistically due to recent innovations in the design of physical unclonable functions (PUFs), which can efficiently generate physically random bits. One way to obfuscate inputs once we have a PUF is to bitwise XOR the input value with the PUF going into an untrusted unit. Coming out of that unit, the data can be XOR'd again with the same PUF to get back the original value since DATA xor PUF xor PUF=DATA. Key storage for this mechanism should be handled by a few trusted bytes of data storage that should be invisible to the rest of the architecture.

Control Interfaces: We do not apply obfuscation to inputs to control interfaces in our implementation. Generally control interfaces are very small (one or a few bits), and they cannot be scrambled without altering the operations performed within the unit. One of our assumptions is that control interfaces are small enough to be verified by validation engineers against single-shot cheat codes. For example, if a control interface is four bits wide, all 16 possibilities can be checked. This assumption worked fine for our analysis of OpenSPARC T2, discussed below. However, there are possible other settings where this would pose a problem. Given many small control interfaces, we are able to individually validate them. Doing so is sufficient to assure there is not a singleshot cheat code on the control interfaces, because a singleshot cheat code that combined bits from multiple separate control interfaces would be easily detectable automatically (by noticing that unrelated bits from separate controls are being fed into extraneous logic).

Sequence Breaking

The last type of backdoor trigger in our complete taxonomy of triggers is the sequence cheat code. We protect against these cheat codes with a method called sequence breaking. The purpose of sequence breaking is to prevent cheat codes from being sent piecemeal. For example, if a unit receives T bits of information over a period of time from many packets, this is similar to receiving the T bits of information from one big packet as a single-shot cheat code. Therefore, we need to obfuscate the sequence of inputs to an untrusted unit, similarly to how we obfuscate the inputs themselves when we handle single-shot cheat codes.

Figure 6:
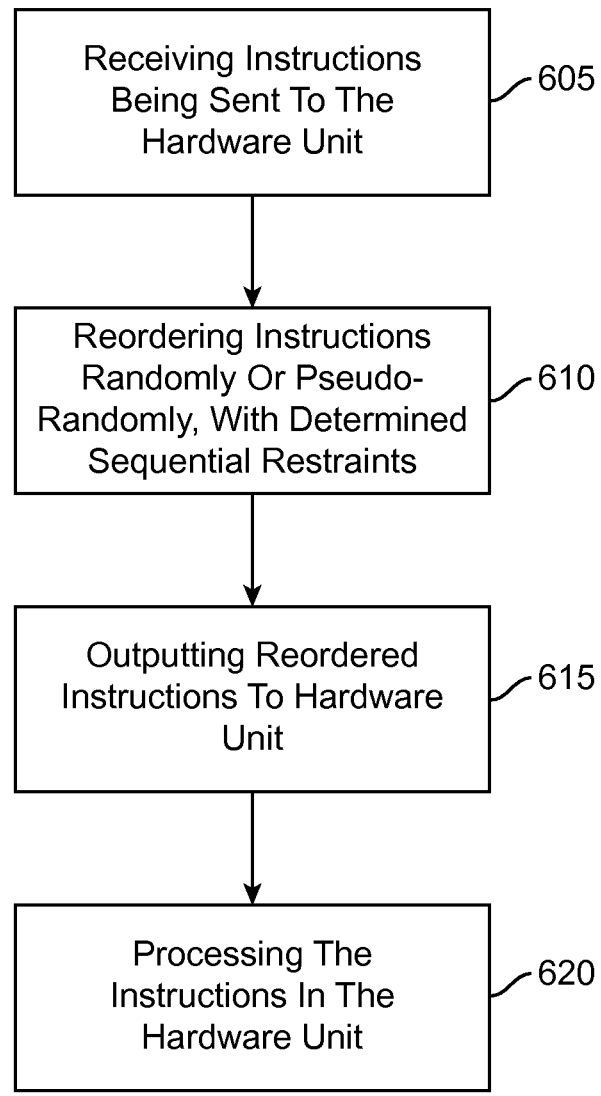
FIG. 6 depicts a method for preventing activation of sequence cheat code hardware backdoors.

FIG. 6 (see also FIG. 1) depicts the method for preventing activation of sequence cheat code hardware backdoors. The method includes receiving, in the reordering element, instructions being sent to the untrusted hardware unit 605, 130 from a trusted unit 135. The instructions are reordered randomly or pseudo-randomly, with certain sequential restraints, in the reordering element 610, 140. The instructions are then output to the hardware unit 615, where they are processed 620.

Our solution is to benignly reorder sequences of inputs so as to preserve correctness but to prevent sequences from being deterministically supplied by a malicious user. If the attacker cannot determine the order in which events will occur, the attacker cannot with significant probability trigger a backdoor with a sequence cheat code. Even if the pieces of the trigger sequence are spread across multiple interfaces or over time, the attacker is unable to send the trigger, because the arrival times and order of arrival will always be mutated.

For example, consider a memory controller with a backdoor that is triggered by a particular sequence of fifty loads and stores that must come in a pre-chosen order. We must make sure it is impossible (or extremely unlikely) for that particular sequence to be supplied by a malicious user.

For the example of the memory controller, we can change the order of those fifty loads and stores to prevent the sequence from looking like the cheat code. By adding physical randomness to the reordering scheme, we can provide strong likelihood (nearly 100%) that a specific malicious sequence will not occur.

It may not always be possible to reorder inputs to a unit. For example, a particular sequence of inputs to a memory controller may not be reorderable without violating sequential consistency or other consistency models. A smart, malicious user may be able to concoct such a sequence. Therefore, in addition to randomly reordering events, we need the ability to add dummy events in the case that reordering is impossible. For example, if we recognize a long stream of loads and stores that cannot be reordered, we can insert a few dummy loads (extra loads to pseudo-randomly chosen places in memory) into the stream to break up the sequence. As long as the unit never receives a sequence in the user-provided order (or in an order that could be deterministically predicted by the malicious user), the user cannot trigger the backdoor. A lot of the functionality for this sequence breaking already exists in modern microprocessors and can be integrated for this purpose with very minor changes.

Probabilistic Security Guarantees

We describe below the probabilistic security guarantees that our methods provide. Our three methods (power resets, data encryption, and data reordering/insertion) are able to provide probabilistic guarantees against the three types of attacks (timebombs, single-shot cheat codes, and sequence cheat codes). By adjusting the parameters in our methods, we can adjust the attacker's probability of success, at the cost of performance. Specific cost vs. security trade-offs are discussed below.

The attacker's goal is to have a significant chance of triggering an attack while causing the validation engineers to have a significant chance of not triggering the attack during testing. If a validation engineer happens to trigger the backdoor, then the attacker's attempt to hide the backdoor is considered to have failed.

We first consider the case of a ticking timebomb. A ticking timebomb goes off after a fixed amount of time (or number of cycles) has passed. If power resets are implemented for every unit, then the attacker is forced to have the timebomb go off during the validation epoch, thus giving the validation engineer a 100% chance of catching the attack. Therefore, if the attacker wants a non-zero chance of success, he or she must allow the validation engineer a 100% chance of catching the attack. So the attacker cannot succeed.

Second we consider a single-shot data trigger attack. If a unit has a large data interface and is covered by data obfuscation (i.e. the data is encrypted) then, assuming a reasonable encryption scheme, a correlation cannot be detected between the input data and the encrypted data received by the unit. This limitation results from the fact that the hardware unit must receive an input every cycle or every few cycles, and one or a few clock cycles is too little to break any reasonable encryption scheme. If the attacker wants to achieve a significant probability of the backdoor turning on when a piece of encrypted data is received, then the probability of the backdoor turning on for any random piece of data must be significant, meaning the probability of the validation engineer turning on the backdoor will be similarly high on each test instruction. Therefore, if the attacker wants a non-zero chance of success, he or she essentially guarantees that the validation engineer catches the attacker. For example, if the attackers want a 1% chance of success, even if the validation epoch is only 10,000 cycles, the probability of the backdoor escaping detection is less than 10-43.

Lastly we consider the sequence data trigger category. In this case the attacker wants to come up with a special sequence of inputs that the validation engineer is unlikely to supply in random testing. The sequence must be long or else the validation engineer can simply exhaust over all possible sequences of inputs. We will define $2^T$ to be the number of different sequences that a validation engineer can exhaustively search through. If a unit's interfaces are protected by reordering or insertion so that it never receives more than T input bits in the order specified by the user, then the attacker is out of luck because the validation engineer can exhaust through all $2^T$ possible combinations of inputs. If the attacker makes the secret sequence code less than or equal to T input bits long, then the validation engineer will trigger the backdoor while performing this search. Therefore, the attacker is forced to make the backdoor longer than T input bits long. This guarantees that the input bits will arrive at the hardware module scrambled and containing dummies. Each extra bit in the backdoor cheat code exponentially increases the number of possible permutations and dummies that must be recognized by the backdoor circuitry. This also exponentially increases the likelihood of the validation engineers tests triggering the backdoor.

For a tangible example, imagine the validation engineer can exhaustively test $2^{20}$ test cases but not more. The attacker, knowing this fact in advance, decides to use a length 21 sequence cheat code in the design and allows in the trigger detection logic that there can be one extra (wrong) input in the sequence (since 21 consecutive inputs cannot get through without obfuscation). There are 22 different places a dummy input can be inserted into the length 21 sequence, and the attacker must accept all 22 of these in order to have a chance of success. In that case, even though the validation engineer cannot exhaust over all $2^{21}$ test cases, he or she has less than a one in a billion chance of missing the backdoor when doing normal validation of $2^{20}$ random test cases. The intuitive reason for this is that the attacker has to allow for any possible reordering of his or her cheat code sequence, which is an exponential explosion of permutations (exponential in the number of dummies and reordering that occur). If we factor into account reordering in addition to dummy inserts, this probability gets even worse for the attacker. The amount of insertion and reordering can be tuned to achieve a desired probability, be it one in a billion, one in a trillion, etc.

The overall effect of our schemes is that an attacker cannot achieve a significant chance of triggering a backdoor without giving the validation engineers a chance of catching the backdoor, and this chance can be parameterized to be exponentially close to 100%. We believe this is the best guarantee that can be provided by a trigger prevention scheme of this nature.

Regardless of how we parameterize our methods, an attacker could use a source of true randomness to create a randomized timebomb that might or might not go off at any time. The attacker and the validator would have equally small chances of setting it off at any time, and if the attacker gets lucky enough, it might go off at an opportune time. Since it is truly random, it doesn't matter if we reset power or scramble inputs. Future work may uncover alternative methods to prevent against non-digital, non-deterministic attacks, and we discuss this briefly below.

Evaluation

Our goals in evaluation are two-fold:

1) to determine what the performance impacts of our mechanisms are on typical programs.

2) to understand trade-offs between strength of security and cost/performance.

We implemented each of the three security mechanisms in the Zesto x.sup.86 simulator. We describe our implementation and trade-offs we wish to study below:

Power Resets: To emulate power resets, we added a mechanism that flushes the processor state at parameterizable time intervals. Flushing the processor state cancels all in-flight instructions, including pending memory requests, and wipes the local state of the core, such as branch prediction tables and other speculative structures, but leaves data in the caches and memory untouched, since we do not wipe out large, standardized structures.

Data Obfuscation: To emulate our data obfuscation techniques, we added to the caches and memory controller the ability to stall for a parameterizable number of cycles on each access. This simulates the effect of adding an encryption step before each access.

Reordering and Insertion: To emulate sequence breaking by reordering and insertion, we simulated a common memory controller and RAM that we found with publicly available specifications (a 4 GB DDR3 SDRAM memory module from Kingston Hyper) and added the ability to stall pending memory accesses in the memory controller before sending them out to RAM. We additionally added the ability to pseudo-randomly reorder two memory accesses before the requests go out. We also added the ability to insert dummy loads to pseudo-randomly generated addresses into the memory controller. These loads are loads to random locations that look real to the memory controller (upper order bits make them look like loads to relevant parts of memory) but have no program relevance. Their results are thrown away rather than given back to the pipeline. The effects of hardware random number generation (e.g., PUFs) were emulated with a pseudo-random number generator with fixed seed (for reproducibility).

Our baseline microarchitecture includes a 64 KB, 8-way associative L1 instruction cache with 1 R/W port, a 2 KB L¬ TAGE branch predictor, 6-way issue, out-of-order execution with speculation and prefetching support, 96-entry ROB, a 64 KB, 8-way associative level 1 data cache with 1 R/W port, 256 KB, 12-way associative unified L2 cache, and a detailed memory controller model. We simulated pinpoint representative regions of seven benchmarks from the SPEC CPU 2006 suite (representative regions generated with the ref input set).

Rather than make assumptions about how much delay to add for each of our modifications, we repeated these simulations with various delays, ranging from very optimistic to very conservative.

Experimental Results

Figure 7:
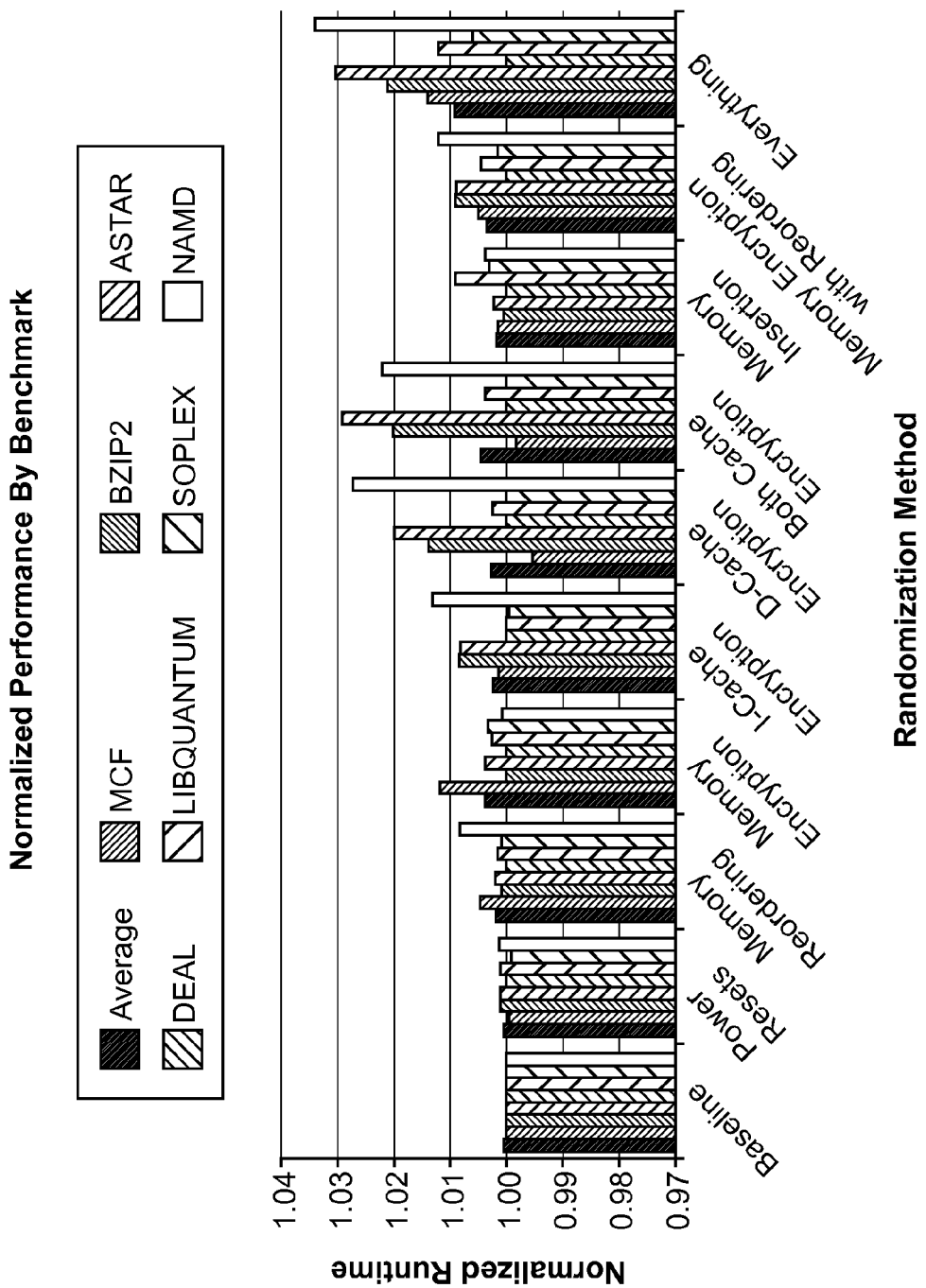
FIG. 7 presents the average normalized runtimes (with 1=the runtime on unmodified hardware) of some of our methods with default parameters, averaged over all of our 100 million instruction checkpoints, as well as breakdowns by benchmark.

FIG. 7 presents the average normalized runtimes (with 1=the runtime on unmodified hardware) of some of our methods with default parameters, averaged over all of our 100 million instruction checkpoints, as well as breakdowns by benchmark. The reordering and insertion based schemes allowed a maximum of 20 bits of information before taking action. Our encryption schemes used one cycle of delay each. Our reset frequency was every 10 million instructions. The "everything" test used all of these hardware modifications together.

FIG. 7 shows the average slowdowns of each of our techniques. None of them caused more than a 1% performance hit on average. The highest bar (i.e., "Everything") is the result of a test with all of the techniques implemented together. The slowdown of all together was less than the sum of the parts, which we attribute to the fact that some of the slowdowns occur concurrently with each other. With all of these techniques together, our benchmarks slowed by an average of just under 0.9%. This figure also displays a breakdown of how each method affected each benchmark. The amount of effect of each method varied somewhat from benchmark to benchmark depending on program characteristics. The two benchmarks that were affected the most were NAMD and ASTAR. We noticed that these two benchmarks had unusually high IPC, which we believe is why they were slightly more affected by our methods. The largest slowdown on any benchmark by any method was about 3.4%.

We can see that some of the techniques, such as power resets, memory reordering and memory insertion, had no significant effect on any of the benchmarks. These results fit our expectations. The power reset method is similar to causing a branch misprediction every 10 million cycles, which is fairly insignificant. The memory reordering in the memory controller, while it does alter the traffic patterns slightly, does not impact performance much because it does not increase overall bandwidth usage. The memory insertion method does increase bandwidth usage slightly, but we expected situations where this actually stalled the processor to be rare, and our results support this. For example, the checkpoint that experienced the highest impact from memory insertion only had about 23 misses per thousand instructions at the last level cache and thus was not too often bandwidth limited. Additionally, even for execution pieces that are bandwidth limited, these areas tend to come in bursts, thus allowing the overall performance hit of memory insertion to be amortized. For a hypothetical program that missed the last level cache on every single instruction, it would probably be best to use the memory reordering scheme, which does not increase overall bandwidth usage.

On the other hand, some techniques, especially data cache stalling, had larger effects. This was to be expected because adding a one cycle delay to every data cache access is significant and is likely to reduce pipeline throughput. This one cycle delay is our conservative measure of the impact of encryption. It is possible to implement the encryption as an extra step that takes one extra cycle before the operation reaches the cache. In reality, it is possible that this encryption, which can be as little as a one or two gate delay, can be squeezed into already existing steps and not cause this one cycle delay. Our results support that doing this may be desirable as the data cache stalling was the most significant performance impact of any of our methods.

Figure 8A:
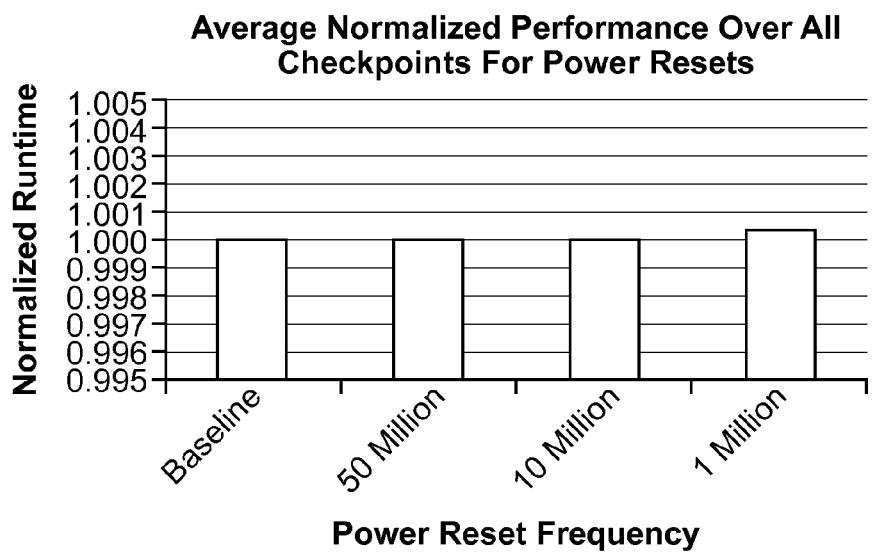
FIGS. 8A-C show three graphs which depict the trade-offs between performance and various parameters resulting from experiments.
Figure 8B:
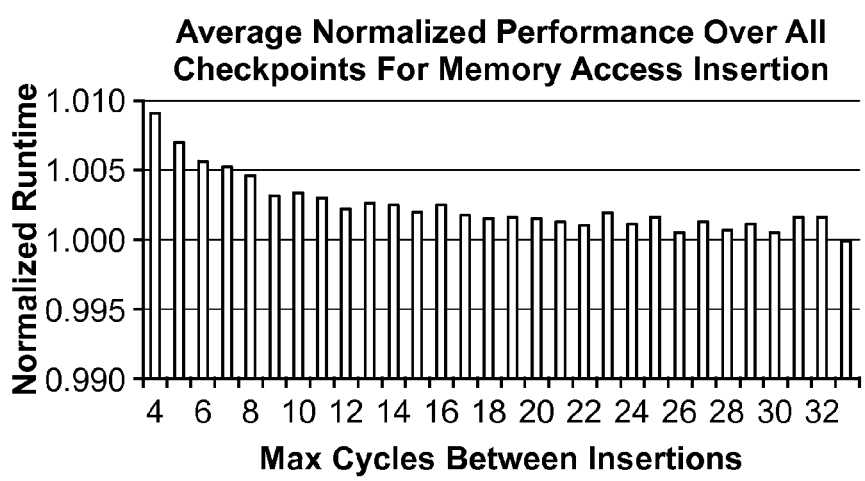
Figure 8C:
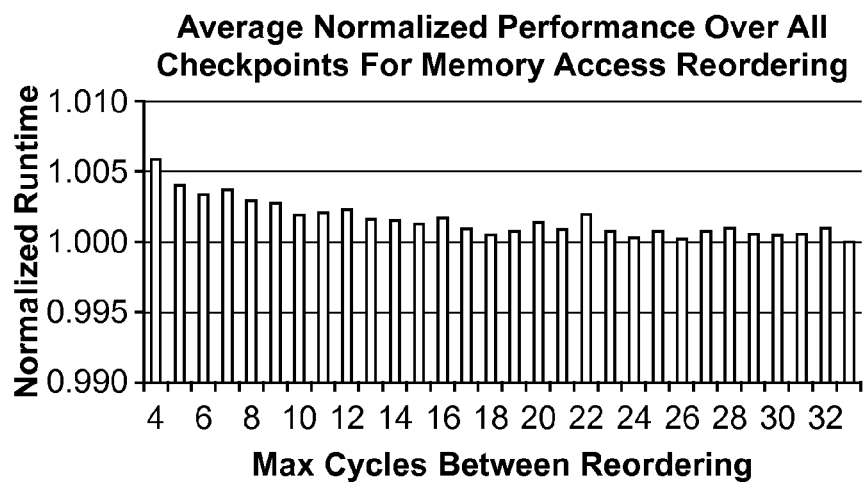

The three charts shown in FIGS. 8A-C depict the trade-offs between performance and various parameters resulting from three experiments. The chart of FIG. 8A elaborates on the trade-off between the power reset frequency and the performance loss that results. Recall that the power reset frequency needs to be less than the validation epoch. Our default frequency of 10 million cycles showed an insignificant performance loss. Pushing the frequency to 1 million cycles increased this performance loss to about 0.3%.

In the chart of FIG. 8B, we see the trade-off between memory insertion frequency and runtime performance. This frequency is determined by the maximum number of bits of information we allow to go through the memory controller before we insert a dummy load (dummy loads happen sooner depending on the random bits generated in the hardware. This value is the maximum that can possibly go through before a dummy must happen. The average time between dummies is about half this). Using a maximum of four inputs, we see just under a 1% performance hit on average. Using our default of 20 inputs, we get a little less than a 0.2% performance hit. Naturally, reducing the frequency of these insertions lessens the performance hit on average (with some degree of noise).

The trade-off between performance and the amount of memory reordering performed in the memory controller is displayed in the chart of FIG. 8C. While we randomly reorder (benignly) memory accesses in the memory controller, we enforce that no more than a certain number of operations can go through without a reordering occurring. Using the low maximum of once every four, we see about a 0.6% performance hit. Using our default of once every twenty inputs, we got about a little under a 0.2% performance hit. This method appears to be a slight optimization over the method of simply inserting dummy operations, but not a very significant one.

Coverage Against Illinois Malicious Processors

One of the earliest set of published Hardware Design Language (HDL) attacks came in the Illinois Malicious Processor' (IMP). This processor has components that can run in benign mode or malicious mode, and malicious mode can be triggered by certain deterministic events. Our defensive mechanisms in the core and memory system are enough to prevent all attacks that leverage the malicious circuitry in this processor.

There are two general mechanisms IMP can leverage to support an attack. The first—malicious memory access— allows any running program to access privileged portions of memory. The malicious user can trigger this backdoor by placing a sequence of (otherwise benign) bytes on the data bus. This attack cannot succeed against our defenses because we never allow a long enough series of bytes to reach the bus without reordering or insertion.

The second mechanism of IMP is called shadow mode. Shadow mode is a generic scheme for executing any software based attack as hidden or 'shadow' instructions. This shadow mode is turned on by a 'bootstrap trigger,' which is basically a special network packet that tells the hardware to initialize shadow mode. This is precisely a single-shot cheat code and would be prevented by our data obfuscation techniques since these packets can be trivially obfuscated (i.e. they are not needed for ALU computation in the unit that recognizes the trigger). Without changing much HDL code, IMP can be reconfigured to use a ticking timebomb to turn on shadow mode, but we would prevent this with our rapid reset technique. Therefore, we provide full guaranteed prevention against the IMP.

Coverage and Practicality for OpenSPARC T2

In order to assess our coverage for a real microprocessor, we analyzed the HDL source code for the OpenSPARC T2 microprocessor. The purpose of this analysis was to measure the practicality of implementing our mechanisms in a real microprocessor. Specifically, we were interested in (a) finding out if power resets can protect all on-chip modules, (b) sizes of the control interfaces to estimate the practicality of exhaustively testing control interfaces and (c) the number of data interfaces that need homomorphic encryption or duplication.

Timebombs are activated through the global interfaces, and we verified that in the OpenSPARC T2 core and memory subsystems, the modules are clocked and synchronous and hence can be protected with power resets. For the remaining two questions, we present first our analysis of the processor core code and then our analysis for the rest of the chip.

The results of manual analysis of an OpenSPARC T2 core are presented in FIG. 9A. We analyzed the code defining the interfaces for each module (roughly 5,840 inputs in total). Since the control interfaces are small, they can be exhaustively validated, thus negating the possibility of single-shot cheat codes against control interfaces. The number of cases required to protect control interfaces by exhaustion is less than 50,000 on average. The largest control interface requires exhausting through 262,144 cases during validation, which is very reasonable because it is common for validation to go for millions of cycles. Therefore, for the OpenSPARC T2 cores, all control interfaces can be validated individually, thus not requiring obfuscation.

Our analysis also reveals that most of the core would not be difficult to protect from single-shot data triggers. Of the eleven top level modules, only three of them perform non-trivial computations on their data interfaces. The rest can be protected by obfuscation schemes, such as XOR. The three difficult modules (Decoder, Execution, Floating Point/Graphics) can be protected with duplication. If design complexity is to be avoided, we can still protect the whole core while only duplicating a fraction of it.

We performed similar analysis on the top level interfaces for the modules in the memory system and the rest of the system-on-chip for the OpenSPARC T2. The results of this analysis are shown in FIG. 9B. Unsurprisingly, we found that nearly all of the data values moving through memory system and the rest of the system-on-chip are transported around but not operated upon arithmetically or logically. The only exception is the level 2 cache tag management unit, which would need to have one of its data interfaces duplicated or cleverly obfuscated (a routing packet that is fed into non-trivial logic for format parsing and ECC). For the rest of the modules, the only work done with data is queueing (mathematically the identity), equality checks (can be done with the encrypted data), and parity checks (can be done with the encrypted data). So nearly all of the system-on-chip can be protected without duplication or homomorphic functions. Additionally, the control interfaces are not vulnerable to single-shot cheat codes, as they average only 10,432 cases for exhaustion. So the control interfaces can be protected by only using sequence breaking Therefore, the OpenSPARC T2 microprocessor can be practically and efficiently defended with our mechanisms.

A convenient feature of this methodology is that we were able to perform this analysis without having to inspect all the code by just focusing on interfaces. For the core, the analysis was possible by reading only a fraction of the HDL code (roughly 5000 lines of Verilog code out of the overall roughly 290,000 lines). Similarly for the full system-on-chip, the analysis was performed by reading only roughly 24,000 lines of Verilog code out of the total roughly one million lines.

CONCLUSION

Our solution is to obfuscate and randomize the inputs to hardware units to deceive the malicious logic and prevent it from recognizing triggers. We propose three methods of hardware randomization that correspond to the three types of digital backdoor triggers. Power resets obfuscate timing information to prevent units from detecting how long they have been powered on. Data obfuscation deceives malicious units by encrypting inputs. Sequence breaking reorders microarchitectural events, providing resilience against backdoors triggered by control information, e.g., event types. These techniques, in concert, prevent malicious hardware logic from detecting trigger signals, thus preventing malicious designers from enabling 'kill switches' or other malicious modifications into hardware designs.

Our simulations show that our methods can be implemented with little performance impact (less than 1% on average). We also discuss how our methods can be parameterized to trade-off performance against probabilistic security.

Design Guidelines for Trustworthiness Certification—As a result of our analysis, we uncovered a few properties that specifications should have in order to be protected against backdoors. Future security measures may either render these requirements unnecessary or add further to this list.

1) Untrusted modules should not be allowed to contain non-volatile memory as they complicate the power reset process.

2) Untrusted modules should not be allowed internal analog components, as these may be used as a source of randomness to allow for randomized timebomb attacks.

3) If a source of true randomness is required in a design, that source should be contained within a small, trusted module.

4) Untrusted modules should not contain control interfaces that cannot be exhaustively validated.

Certain embodiments described above may include electronic hardware, software, or a combination of both. Software may be embodied on a computer-readable medium, such as a disk or memory, which may be non-transitory. For example, the methods described herein may be implemented in the form of Hardware Design Language (HDL) or Verilog code which can be incorporated into digital circuit designs.

Other embodiments, extensions, and modifications of the ideas presented above are comprehended and should be within the reach of one versed in the art upon reviewing the present disclosure. Accordingly, the scope of the disclosed subject matter in its various aspects should not be limited by the examples presented above. The individual aspects of the disclosed subject matter, and the entirety of the disclosed subject matter should be regarded so as to allow for such design modifications and future developments within the scope of the present disclosure. The disclosed subject matter can be limited only by the claims that follow.

What is claimed is:

1. A method for preventing activation of hardware backdoors installed in a digital circuit, the digital circuit comprising at least one hardware unit to be protected, the method comprising:
    receiving by at least one obfuscation unit data intended to the at least one hardware unit, the data including an activation code to cause the activation of a hardware backdoor present in the at least one hardware unit;
    obfuscating the received data by the at least one obfuscation unit to generate obfuscated data, with the obfuscated data including an obfuscated activation code, and outputting the obfuscated data to the at least one hardware unit;
    processing the obfuscated data including the obfuscated activation code in the at least one hardware unit without the hardware backdoor being activated by the obfuscated activation code, and outputting the processed obfuscated data; and
    de-obfuscating the processed obfuscated data in at least one de-obfuscation unit after the processed obfuscated data is output by the at least one hardware unit.

2. The method of claim 1, wherein the at least one obfuscation unit comprises at least one encryption element, and the at least one de-obfuscation unit comprises at least one decryption element;
    wherein receiving by the at least one obfuscation unit the data comprises receiving, by the at least one encryption element, the data intended to the at least one hardware unit;
    wherein obfuscating the received data comprises encrypting the received data in the at least one encryption element and outputting the encrypted data to the at least one hardware unit;
    wherein processing the obfuscated data comprises processing the encrypted data in the at least one hardware unit and outputting the processed encrypted data; and wherein de-obfuscating the processed obfuscated data comprises decrypting the processed encrypted data in the at least one decryption element after the processed encrypted data is output by the at least one hardware unit;

and wherein encryption of the data renders the activation code, embedded in the data, unrecognizable to the hardware backdoor when the hardware backdoor is present in the at least one hardware unit.

3. The method of claim 2, wherein the encryption of the data, processing operations of the encrypted data in the at least one hardware unit, and decryption of the processed encrypted data output by the at least one hardware unit yields a same result as performing processing of the data, by the at least one hardware unit, without encrypting the data by the at least one encryption element and decrypting the processed data output by the at least one hardware unit.

4. The method of claim 2, wherein the at least one encryption element and the at least one decryption element of the digital circuit are verified trusted units incorporated into the digital circuit.

5. The method of claim 2, wherein encrypting the data and decrypting the processed encrypted data are performed using invertible functions.

6. The method of claim 2, wherein encrypting the data comprises:
encrypting the data using one or more of: an exclusive OR operation (XOR), or an addition operation with a random value.

7. The method of claim 2, wherein encrypting the data and decrypting the processed encrypted data are performed using a first function, f, which is homomorphic with respect to a second function, g, performed by the at least one hardware unit, such that: $f(g(x), g(y))=g(f(x, y))$.

8. The method of claim 2, wherein encrypting the data comprises:
encrypting the data using an exclusive OR operation (XOR) of the data with a random value generated by a physically unclonable function.

9. The method of claim 8, wherein decrypting the processed encrypted data comprises:
decrypting the processed encrypted data using an exclusive OR operation (XOR) of the processed encrypted data output by the at least one hardware unit with the random value generated by the physically unclonable function.

10. The method of claim 8, wherein the random value generated by the physically unclonable function is stored in a verified trusted memory unit.

11. The method of claim 1, wherein the at least one hardware unit to be protected includes a cryptographic unit;
wherein obfuscating the received data comprises computing, in a verified arithmetic logic unit (ALU), a product $z=xy$, where x is a sensitive data element, and y is a generated random value;
wherein processing the obfuscated data in the at least one hardware unit comprises encrypting the value z in the cryptographic unit to obtain an encrypted value RSA(z), and encrypting the value y in the cryptographic unit to obtain an encrypted value RSA(y);
and wherein de-obfuscating the processed obfuscated data comprises computing an encrypted value RSA(x) corresponding to the sensitive data element by dividing RSA (z) by RSA(y) using the verified ALU or a second ALU.

12. The method of claim 11, wherein the verified ALU is a verified trusted unit incorporated into the digital circuit.

13. The method of claim 1, wherein the digital circuit comprises one or more of: a microprocessor, a digital signal processor, a memory controller, a micro-controller, a network controller, a display controller, a graphic core, a bus interfaces, a cryptographic unit, a decoder, an encoder, a content addressable memory (CAM), or a memory block.

14. A system for preventing activation of hardware backdoors installed in a digital circuit, the digital circuit comprising at least one hardware unit to be protected, the system comprising:
at least one obfuscation unit connected to an input of the at least one hardware unit, the at least one obfuscation unit configured to receive data intended to be sent to the at least one hardware unit, with the data including an activation code to cause the activation of a hardware backdoor present in the at least one hardware unit, to obfuscate the received data to generate obfuscated data, with the obfuscated data including an obfuscated activation code, and to output the obfuscated data to the at least one hardware unit;
at least one de-obfuscation unit connected to an output of the at least one hardware unit;
wherein the at least one hardware unit is configured to process the obfuscated data including the obfuscated activation code without the hardware backdoor being activated by the obfuscated activation code, and to output the processed obfuscated data to the at least one de-obfuscation unit, the at least one de-obfuscation unit configured to de-obfuscate the processed obfuscated data.

15. The system of claim 14, wherein the at least one obfuscation unit comprises at least one encryption element connected to the input of the at least one hardware unit, the at least one encryption element configured to receive the data intended to be sent to the at least one hardware unit, encrypt the received data, and output to the encrypted data to the at least one hardware unit;
wherein the at least one de-obfuscation unit comprises at least one decryption element connected to the output of the at least one hardware unit;
wherein the at least one hardware unit is configured to process the encrypted data and to output the processed encrypted data to the at least one decryption element, the at least one decryption element configured to decrypt the processed encrypted data;
and wherein encryption of the data renders the activation code, embedded in the data, unrecognizable to the hardware backdoor when the hardware backdoor is present in the at least one hardware unit.

16. The system of claim 15, wherein the at least one encryption element and the at least one decryption element of the digital circuit are verified trusted units incorporated into the digital circuit.

17. The system of claim 15, wherein the encryption of the data, processing operations of the encrypted data in the at least one hardware unit, and decryption of the processed encrypted data output by the at least one hardware unit yields a same result as performing processing of the data, by the at least one hardware unit, without encrypting the data by the at least one encryption element and decrypting the processed data output by the at least one hardware unit.

18. The system of claim 15, wherein the at least one encryption element and the at least one decryption element are configured to use invertible functions.

19. The system of claim 15, wherein the at least one encryption element configured to encrypt the data is configured to:

encrypt the data using one or more of: an exclusive OR operation (XOR), or an addition operation with a random value.

20. The system of claim 15, wherein the at least one encryption element and the at least one decryption element are configured to use a first function, f, which is homomorphic with respect to a second function, g, used by the at least one hardware unit, such that: $f(g(x), g(y))=g(f(x, y))$.

21. The system of claim 15, wherein the at least one encryption element configured to encrypt the data is configured to:
encrypt the data using an exclusive OR operation (XOR) of the data with a random value generated by a physically unclonable function.

22. The system of claim 21, wherein the at least one decryption element configured to decrypt the processed encrypted data is configured to:
decrypt the processed encrypted data using an exclusive OR operation (XOR) of the encrypted processed data output by the at least one hardware unit with the random value generated by the physically unclonable function.

23. The system of claim 21, wherein the random value generated by the physically unclonable function is stored in a verified trusted memory unit.

24. The system of claim 15, wherein the at least one hardware unit comprises a cryptographic unit;
wherein the at least one obfuscation unit comprises a verified arithmetic logic unit (ALU) configured to compute a product $z=xy$, where x is a sensitive data element, and y is a generated random value;
wherein the cryptographic unit is configured to encrypt the value z to obtain an encrypted value RSA(z), and to encrypt the value y to obtain an encrypted value RSA(y);
and wherein the at least one de-obfuscation unit comprises the verified ALU or a second ALU, the at least one de-obfuscation unit configured to compute an encrypted value RSA(x) corresponding to the sensitive data element by dividing RSA(z) by RSA(y) using the verified ALU or the second ALU.

25. The system of claim 15, wherein the digital circuit comprises one or more of: a microprocessor, a digital signal processor, a memory controller, a micro-controller, a network controller, a display controller, a graphic core, a bus interfaces, a cryptographic unit, a decoder, an encoder, a content addressable memory (CAM), or a memory block.

26. A non-transitory storage device containing executable instructions that, when executed on a digital circuit comprising at least one hardware unit to be protected, at least one obfuscation unit, and at least one de-obfuscation unit, cause operations comprising:
receiving by the at least one obfuscation unit data intended to the at least one hardware unit, the data including an activation code to cause the activation of a hardware backdoor present in the at least one hardware unit;
obfuscating the received data by the at least one obfuscation unit to generate obfuscated data, with the obfuscated data including obfuscated activation code, and outputting the obfuscated data to the at least one hardware unit;
processing the obfuscated data including the obfuscated activation code in the at least one hardware unit without the hardware backdoor being activated by the obfuscated activation code, and outputting the processed obfuscated data; and
de-obfuscating the processed obfuscated data in at least one de-obfuscation unit after the processed obfuscated data is output by the at least one hardware unit.

27. The non-transitory storage device of claim 26, wherein the at least one obfuscation unit comprises at least one encryption element, and the at least one de-obfuscation unit comprises at least one decryption element;
wherein receiving by the at least one obfuscation unit the data comprises receiving, by the at least one encryption element, the data intended to the at least one hardware unit;
wherein obfuscating the received data comprises encrypting the received data in the at least one encryption element and outputting the data to the at least one hardware unit;
wherein processing the obfuscated data comprises processing the encrypted data in the at least one hardware unit and outputting the processed encrypted data; and
wherein de-obfuscating the processed obfuscated data comprises decrypting the processed encrypted data in the at least one decryption element after the processed encrypted data is output by the at least one hardware unit;
and wherein encryption of the data renders the activation code, embedded in the data, unrecognizable to the hardware backdoor when the hardware backdoor is present in the at least one hardware unit.

28. The non-transitory storage device of claim 26, wherein the at least one hardware unit to be protected includes a cryptographic unit;
wherein obfuscating the received data comprises computing, in a verified arithmetic logic unit (ALU), a product $z=xy$, where x is a sensitive data element, and y is a generated random value;
wherein processing the obfuscated data in the at least one hardware unit comprises encrypting the value z in the cryptographic unit to obtain an encrypted value RSA(z), and encrypting the value y in the cryptographic unit to obtain an encrypted value RSA(y);
and wherein de-obfuscating the processed obfuscated data comprises computing an encrypted value RSA(x) corresponding to the sensitive data element by dividing RSA(z) by RSA(y) using the verified ALU or a second ALU.

* * * * *